US012272968B2

(12) United States Patent
Kim et al.

(10) Patent No.: US 12,272,968 B2
(45) Date of Patent: Apr. 8, 2025

(54) NEAR FIELD COMMUNICATION AND WIRELESS POWER

(71) Applicant: Renesas Electronics America Inc., Milpitas, CA (US)

(72) Inventors: Changjae Kim, San Jose, CA (US); Detelin Martchovsky, Fremont, CA (US); Amit Bavisi, Los Gatos, CA (US); Sophia Yi, Milpitas, CA (US)

(73) Assignee: Renesas Electronics America Inc., Milpitas, CA (US)

( * ) Notice: Subject to any disclaimer, the term of this patent is extended or adjusted under 35 U.S.C. 154(b) by 0 days.

(21) Appl. No.: 16/845,804

(22) Filed: Apr. 10, 2020

(65) Prior Publication Data

US 2020/0366135 A1 Nov. 19, 2020

Related U.S. Application Data

(60) Provisional application No. 62/849,803, filed on May 17, 2019.

(51) Int. Cl.
*H02J 50/80* (2016.01)
*H02J 50/12* (2016.01)
*H04B 5/72* (2024.01)
*H04B 5/79* (2024.01)

(52) U.S. Cl.
CPC .............. *H02J 50/80* (2016.02); *H02J 50/12* (2016.02); *H04B 5/72* (2024.01); *H04B 5/79* (2024.01)

(58) Field of Classification Search
CPC ........ H02J 50/80; H02J 50/12; H04B 5/0037; H04B 5/0031; H04B 5/0056; H04B 5/79; H04W 4/80
See application file for complete search history.

(56) References Cited

U.S. PATENT DOCUMENTS

| 9,853,458 B1* | 12/2017 | Bell ...................... H02J 50/90 |
| 2011/0127843 A1* | 6/2011 | Karaoguz ............ H04B 5/0037 |
| | | 307/104 |
| 2015/0024684 A1* | 1/2015 | Tamura .................... H04B 5/02 |
| | | 455/41.1 |

(Continued)

FOREIGN PATENT DOCUMENTS

CN 104584448 A 4/2015

OTHER PUBLICATIONS

Office Action for Korea Patent Application 10-2020-0057638, dated Aug. 21, 2024, 6 pages.

*Primary Examiner* — Rexford N Barnie
*Assistant Examiner* — Rasem Mourad
(74) *Attorney, Agent, or Firm* — Haynes and Boone, LLP

(57) ABSTRACT

A wireless power system is disclosed that allows data to be read and written into a wireless power transmission system of a wireless power transmitter through near-field communications (NFC). A method of exchanging data with a power transmission system in the wireless power transmitter and a graphical user interface coupled to a wireless power receiver in communications with the wireless power transmitter includes communicating a data packet with the power transmission system through a near-field communications (NFC) link between a wireless power receiver and the wireless power transmitter; receiving the data packet in the power transmission system; and performing a task defined by a header command code in the data packet.

9 Claims, 17 Drawing Sheets

(56) References Cited

U.S. PATENT DOCUMENTS

| | | | |
|---|---|---|---|
| 2015/0094006 A1* | 4/2015 | Choi | H04B 5/0056 |
| | | | 455/232.1 |
| 2016/0181818 A1* | 6/2016 | Joye | H04B 5/0031 |
| | | | 307/104 |
| 2016/0286021 A1* | 9/2016 | Takeuchi | H04M 1/72412 |
| 2016/0322853 A1* | 11/2016 | Porat | H04B 5/0056 |
| 2017/0018936 A1* | 1/2017 | Muratov | H04B 5/0037 |
| 2017/0294798 A1* | 10/2017 | Yuk | H04B 5/0037 |
| 2018/0260209 A1* | 9/2018 | Dooley | H04B 5/0031 |
| 2019/0148966 A1 | 5/2019 | Choi et al. | |
| 2019/0148980 A1* | 5/2019 | Kim | H02J 50/12 |
| | | | 307/104 |
| 2019/0305826 A1* | 10/2019 | Park | H02J 5/00 |
| 2022/0190646 A1* | 6/2022 | Park | H02J 50/12 |

\* cited by examiner

900

| GUI 130 to PTx system 116 | | PTx system 116 to GUI 130 | |
|---|---|---|---|
| 0x00 | 0x01 | 0x00 | 0x01 |
| 0x01 | Data Size | 0x01 | Data Size |
| 0x02 | 0x00 | 0x02 | 0x00 |
| 0x03 | 0x00 | 0x03 | 0x00 |
| 0x04 | Data 124 bytes max | 0x04 | Data 124 bytes max |
| 0x7f | | 0x7f | |

→ Send back →

| GUI 130 to PTx system 116 | | PTx system 116 to GUI 130 | |
|---|---|---|---|
| 0x00 | 0x02 | 0x00 | 0x02 |
| 0x01 | Data Size | 0x01 | Data Size |
| 0x02 | 0x00 | 0x02 | 0x00 |
| 0x03 | 0x00 | 0x03 | 0x00 |
| 0x04 | Data 124 bytes max | 0x04 | Data 124 bytes max |
| 0x7f | | 0x7f | |

→ Invert BITS of the data →

NEAR FIELD COMMUNICATION AND WIRELESS POWER

RELATED APPLICATIONS

The present disclosure claims priority to U.S. Provisional Application Ser. No. 62/849,803, filed on May 17, 2019, which is herein incorporated by reference in its entirety.

TECHNICAL FIELD

Embodiments of the present invention are related wireless transmission of power and, in particular, to near-field communications in wireless power transmission.

DISCUSSION OF RELATED ART

Mobile devices, for example smart phones, tablets, wearables and other devices are increasingly using wireless power charging systems. In general, wireless power transfer involves a transmitter driving a transmit coil and a receiver with a receiver coil placed proximate to the transmit coil. The receiver coil receives the wireless power generated by the transmit coil and uses that received power to drive a load, for example to provide power to a battery charger.

There are multiple different standards currently in use for the wireless transfer of power. The more common standards for wireless transmission of power include the Alliance for Wireless Power (A4WP) standard and the Wireless Power Consortium standard, the Qi Standard. Under the Wireless Power Consortium, the Qi specification, a resonant inductive coupling system is utilized to charge a single device at the resonance frequency of the receiver coil circuit. In the Qi standard, the receiving device coil is placed in close proximity with the transmission coil while in the A4WP standard, the receiving device coil is placed near the transmitting coil, potentially along with other receiving coils that belong to other charging devices.

Typically, a wireless power system includes a transmitter coil that is driven to produce a time-varying magnetic field and a receiver coil, which can be part of a device such as a cell phone, PDA, computer, or other device, that is positioned relative to the transmitter coil to receive the power transmitted in the time-varying magnetic field.

The wireless power system may further include data communications between the wireless power transmitter and the wireless power receiver of the wireless power system. The data communications may use the transmitter coil and the receiver data to exchange data or may use other systems.

Therefore, there is a need to develop better wireless power systems that include better data communications.

SUMMARY

A wireless power system is disclosed that allows data to be read and written into a wireless power transmission system of a wireless power transmitter through near-field communications (NFC). A method of exchanging data with a power transmission system in the wireless power transmitter and a graphical user interface coupled to a wireless power receiver in communications with the wireless power transmitter includes communicating a data packet with the power transmission system through a near-field communications (NFC) link between a wireless power receiver and the wireless power transmitter; receiving the data packet in the power transmission system; and performing a task defined by a header command code in the data packet.

These and other embodiments are discussed below with respect to the following figures.

BRIEF DESCRIPTION OF THE FIGURES

FIGS. 9A through 9D illustrate packets for transmission of data between and commands between a GUI and a PTx system as illustrated in FIGS. 1C, 2A, and 2B.

These figures are further discussed below.

DETAILED DESCRIPTION

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description illustrates inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention.

Figure 1A:
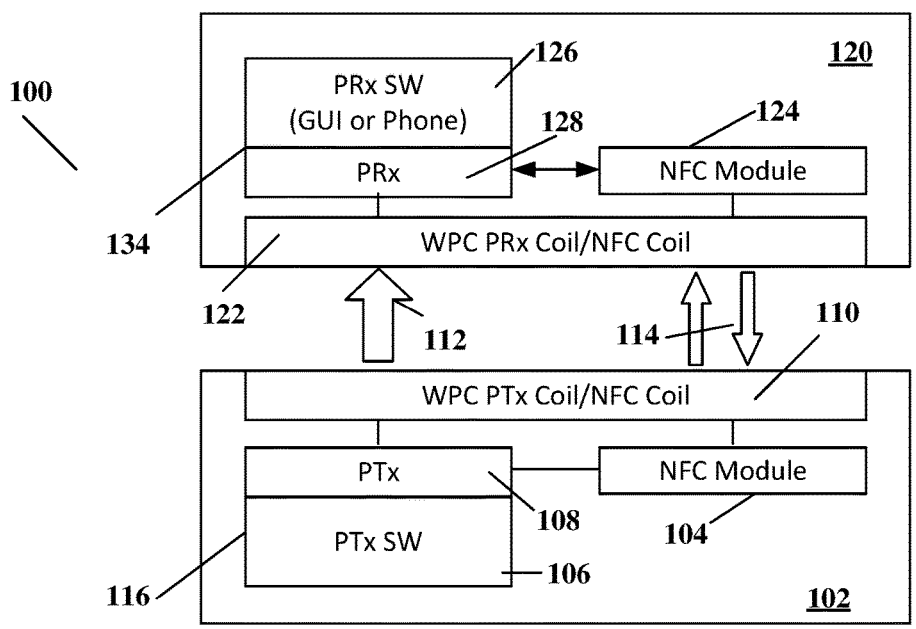
FIGS. 1A, 1B, and 1C illustrate a wireless power system with NFC communications according to some embodiments.
Figure 1B:
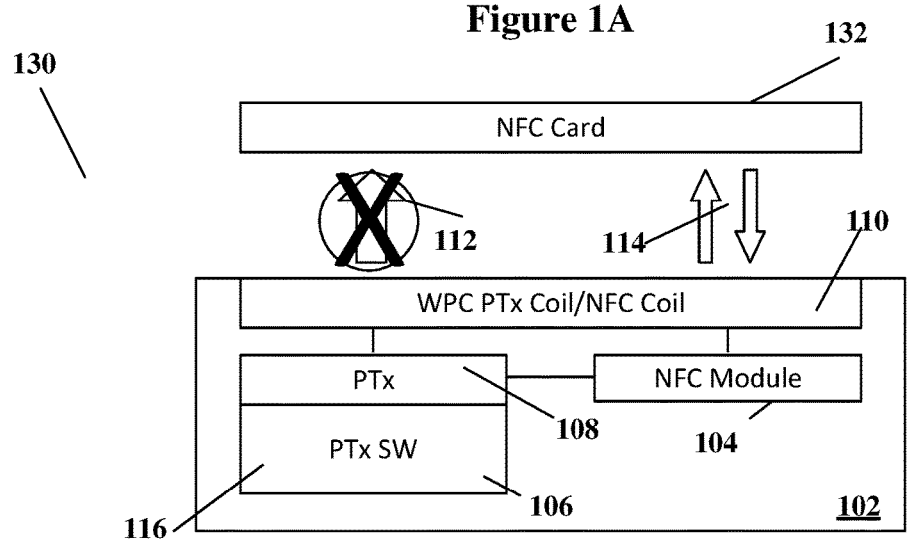

FIGS. 1A and 1B illustrate a wireless power system that uses NFC communications. FIG. 1A illustrates a system 100 where a power transmitter (PTx) 102 is in communication with a power receiver (PRx) 120. FIG. 1B illustrates a system 130 where PTx 102 is in communication with an NFC card 132.

As is illustrated in FIGS. 1A and 1B, PTx 102 includes a power transmitter driver 108 and a near-field communications (NFC) module 104. Power transmitter (PTx) driver 108 and NFC module 104 are coupled to coils 110. Coils 110 include the wireless power transfer coils and the NFC coils. In some embodiments, the wireless power transfer coils and the NFC coils may be separate and in other embodiments combined coils may be used. As such, coils 110 can be any configuration of coils that allows for the transmission of wireless power and also allows for NFC communications.

As is further illustrated in FIGS. 1A and 1B, PTx 102 further includes a processor 106 that is coupled with PTx driver 108. Processor 106, labeled as PTx SW in FIG. 1A, controls PTx driver 108. In some embodiments, processor 106 and PTx driver 108 may be formed on a single integrated circuit (IC), PTx system 116. Processor 108 can include sufficient processing and memory to execute programming stored in the memory. An example of PTx chip 116 according to some embodiments can be the IDT 9242 wireless power transmission chip, although many other wireless power transmission ICs are also available for this purpose.

In some embodiments, PTx driver 108 provides gate signals to a transistor bridge to driver wireless power coils in coils 110. The transistor bridge may be external to the integrated circuit. Furthermore, PTx 102 may be power by battery or by coupling with another power source, for example a standard AC power source.

In accordance with embodiment of the present invention, PTX 102 also includes NFC module 104. NFC module 104 is coupled to coils 110 to provide near-field communication. NFC module 104 may itself be formed on an integrated circuit. NFC module 104 may also include a processor and memory for holding instructions to be executed by the processor of NFC module 104. As such, PTx 102 according to embodiments of the invention communicate using NFC technologies with the NFC module 104 and transfer wireless power according to the PTx driver 108 and processor 106. NFC module 104 is illustrated as in communications with processor 106.

PTx 102, as discussed above, includes coils 110, an NFC module 104, PTX 108 and processor 106 of PTx chip 116, along with other components such as transistors for a transistor bridge to drive coils 110. These components can be configured on a single printed circuit board (PCB). Further, PTx 102 can be mounted into a stationary platform such as a charging station or may be incorporated in a mobile unit such as a laptop, smartphone, table, or other user device.

FIG. 1A illustrates PTx 102 communicating with and transferring power to a wireless power receiver PRx 120. As illustrated FIG. 1A, system 100 includes PTx 102 in communication with PRx 120. PRx 120 includes coils 122, which includes wireless power receive coils as well as NFC coils. As discussed with coils 110 as discussed above, coils 122 can be any configuration of coils that allows for both the receipt of wireless power and communications using NFC configuration.

PRx 120 includes an NFC module 124 coupled to coils 122 and a PRx driver 128 coupled to coils 128. A processor 126 controls PRx 128 to control PRx 128. Processor 126 can include a microprocessor and memory that holds instructions that are executed on the microprocessor. In some embodiments, processor 126 and PRx 128 can be formed on a single IC, PRx chip 134. For example, processor 126 and PRx 128 can be an IDT 9238 receiver chip, although other receiver chips are available for this purpose. In some embodiments, NFC module 124, coils 122, PRx driver 128, and processor 126 can be formed on a PCB. Further, PRx driver 128 may be coupled to transistors of a rectifier also mounted on the PCB. Processor 126 is therefore in communication with NFC module 124 and may also be in communication with other components, for example in a tablet or smart phone.

Consequently, as discussed above transmitter coil 110 and receiver coil 122 further include near-field coils (NFCs) coupled to NFC modules. PTx 102 includes a power transmitter chip, which includes PTx driver 108 and processor 106, that drives coils 112 to transmit wireless power. PTx 102 is in communications with PRx 120 through NFC module 104 of the wireless power transmitter and NFC module 124 of PRx 120. PRx 120 can include a receiver system processor 126 (labeled PRx SW), which may be coupled to a GUI, phone, or other controlling device within a device that includes PRx 120. Similarly, PRx 102 can include a system controller or processor 108 (PTx SW) that is coupled to control the PTx driver 108. In FIG. 1A, wireless power transmission 112 illustrates the transfer of wireless power between PTx 102 and PRx 120.

FIG. 1A further illustrates that PRx SW 126 can communicate with PTx SW 106 through the NFC modulate 124 and 104 and the NFC coils incorporated in coils 122 and 110, which is depicted as NFC communication 114. The communicated data can include power control data, wireless power consortium (WPC) system information, authentication data, or other data. Consequently, some embodiments can provide data communications between PTx 102 and PRx 120 through NFC communications.

FIG. 1B illustrates the reaction of the wireless power transmitter when an NFC card 132 is placed proximate to coil 110 of PTx 102 instead of a PRx 120. In that case, the NFC module 104 of the wireless power transmitter can detect the NFC card 132 near the WPC coils 110 and send a notification to PTx SW processor 106 of PTx 102. In that case, the PTx processor 106 stops power transfer 112 when NFC card 132 is detected and does not start wireless power transfer 112 again until the NFC card 132 is removed. In some embodiments, the NFC module 104 can communicate data to the PTx processor 106 through an I2C interface.

Figure 1C:
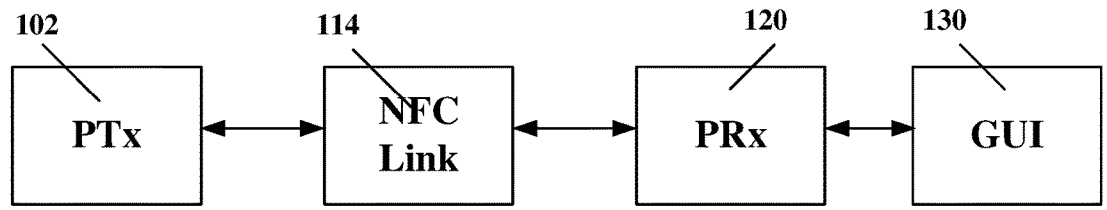

FIG. 1C illustrates system 100 above. As is illustrated above, PTx 102 communicates over NFC link 114 with PRx 120. Further, PRx 120 can be coupled to further processors, including a graphical user interface (GUI) 130. GUI 130 can be any user interface, including keyboards, display screens, touch screens, and other display and user input devices. PRx 120 may further be in communication with other components of a user device, of which GUI 130 is a part, such as smart phones, laptops, tablets, and the like. Embodiments of the present invention allow communications with PTx 102 using GUI 130. Although many commands may be supported by embodiments of the present invention, some common commands may include Copy, Modify, Save, and ReadBack commands that allow GUI 130 to directly exchange data with PRx system 116 through NFC link 114.

Figure 2A:
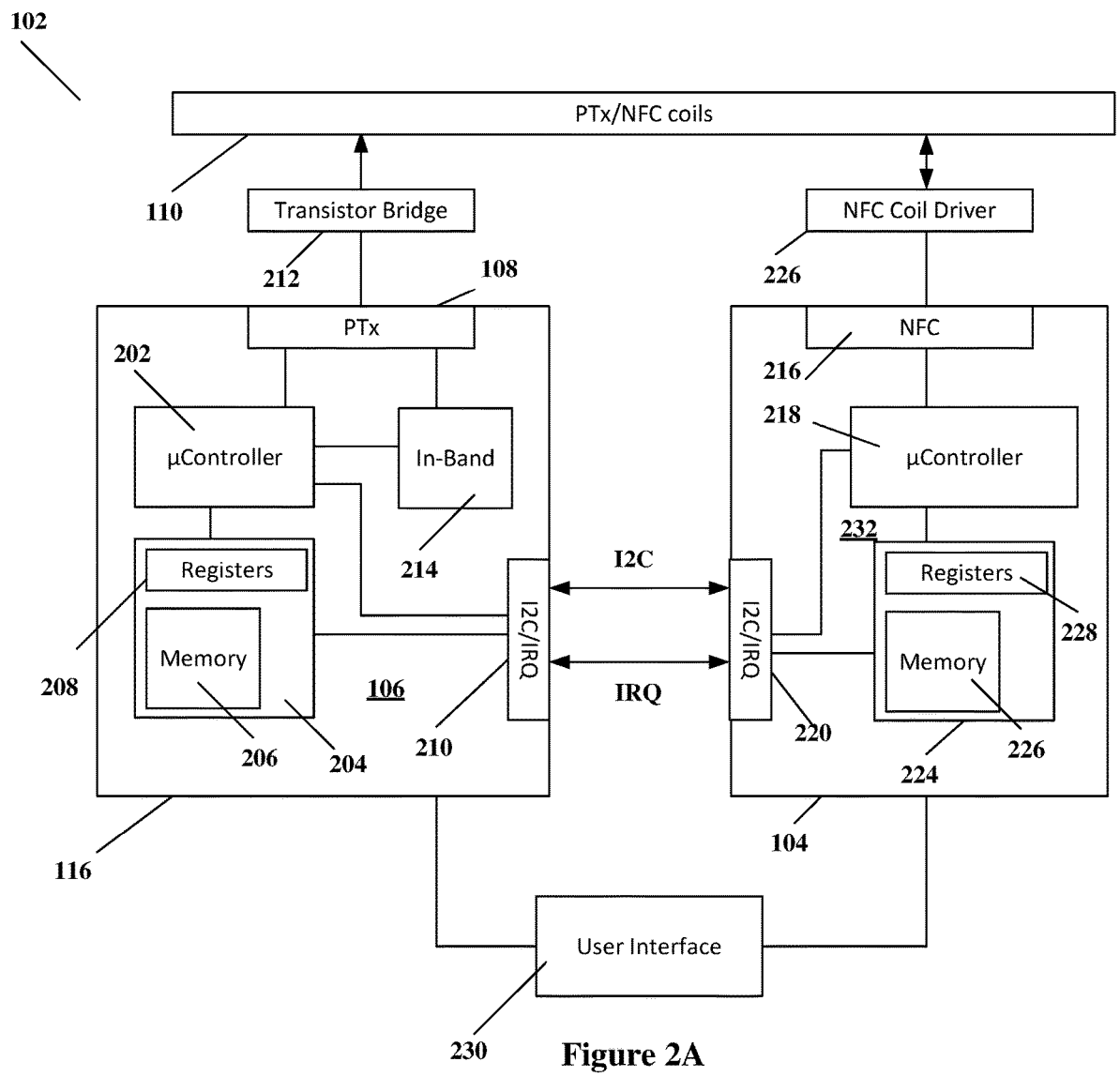
FIG. 2A illustrates illustrate in further detail some embodiments of a wireless power transmitter as illustrated in FIGS. 1A, 1B, and 1C.

FIG. 2A illustrates in further detail some embodiments of PTx 102 as illustrated in FIGS. 1A through 1C. As illustrated, PTx 102 includes PTX/NFC coils 110 as discussed above coupled to a PTx driver 108, which is controlled by PTx SW processor 106, and NFC module 104. As discussed above, PTx driver 108 and PTx SW processor 106 can be formed on a single IC or may be separate components, but together forms PTx system 116.

PTx driver 108 of PTx system 116 is coupled through a transistor bridge 212 that, under the control of Ptx 108, provides current to coils 110. As is further illustrated processor 106 includes a controller 202. Controller 202 can be any processor, including microcomputers, microcontrollers, programmable gate arrays (FPGAs), application specific integrated circuits (ASICs), digital signal processors (DSPs), or any other device that is capable of performing the functions described in this disclosure. Controller 202 is coupled to a memory module 204, which can include both volatile and non-volatile memory 206 for storing data and instructions. Further, memory module 204 includes registers 208, which may be separated from the memory of memory 206 or may be separate from memory 206.

Further, controller 202 may be coupled to an in-band communications 214. In-band communications 214 can send and receive data through wireless power signal 112. In-band communications 214 can, for example, send data by modulating the frequency component of the transmitted wireless power signal 112 and receive data by monitoring the amplitude of the transmitted wireless power signal 112. The amplitude of the transmitted wireless power signal 112 can be modulated by a receiver 120, for example, by modulating a load coupled to the wireless power signal.

Additionally, controller 202 may be coupled to a data bus, for example an I2C interface 210. Other data transmission systems may also be used, but for the purpose of example in this disclosure, the I2C protocol is disclosed. Additionally, processor 106 can be interfaced to a user interface 230. User interface 230 may include other processors and a user interface or may include an interface that couples to, for example, a tablet or laptop that allows a user to couple with system 116.

As is further illustrated in FIG. 2A, NFC module 104 includes a NFC soft controller (NSC) 232, which includes a controller 218 and memory module 224. As is illustrated, controller 218 is coupled to an I2C interface 220. Consequently, NFC module 104 can communicate data with system 116 through I2C interface 220 and I2C interface 210. Controller 218 can be any processor, including microcomputers, microcontrollers, programmable gate arrays (FPGAs), application specific integrated circuits (ASICs), digital signal processors (DSPs), or any other device that is capable of performing the functions described in this disclosure. Controller 218 is coupled to a memory module 224, which can include both volatile and non-volatile memory 226 for storing data and instructions. Further, memory module 224 includes registers 228, which may be separated from the memory of memory 226 or may be separate from memory 226. Further, microcontroller 218 can be coupled through an NFC driver 216 to a NFC coil driver 226, which is coupled to PTx/NFC coils 110 to send and receive data. As is further illustrated in FIG. 2A, NFC module 104 may also be coupled to user interface 230.

Figure 2B:
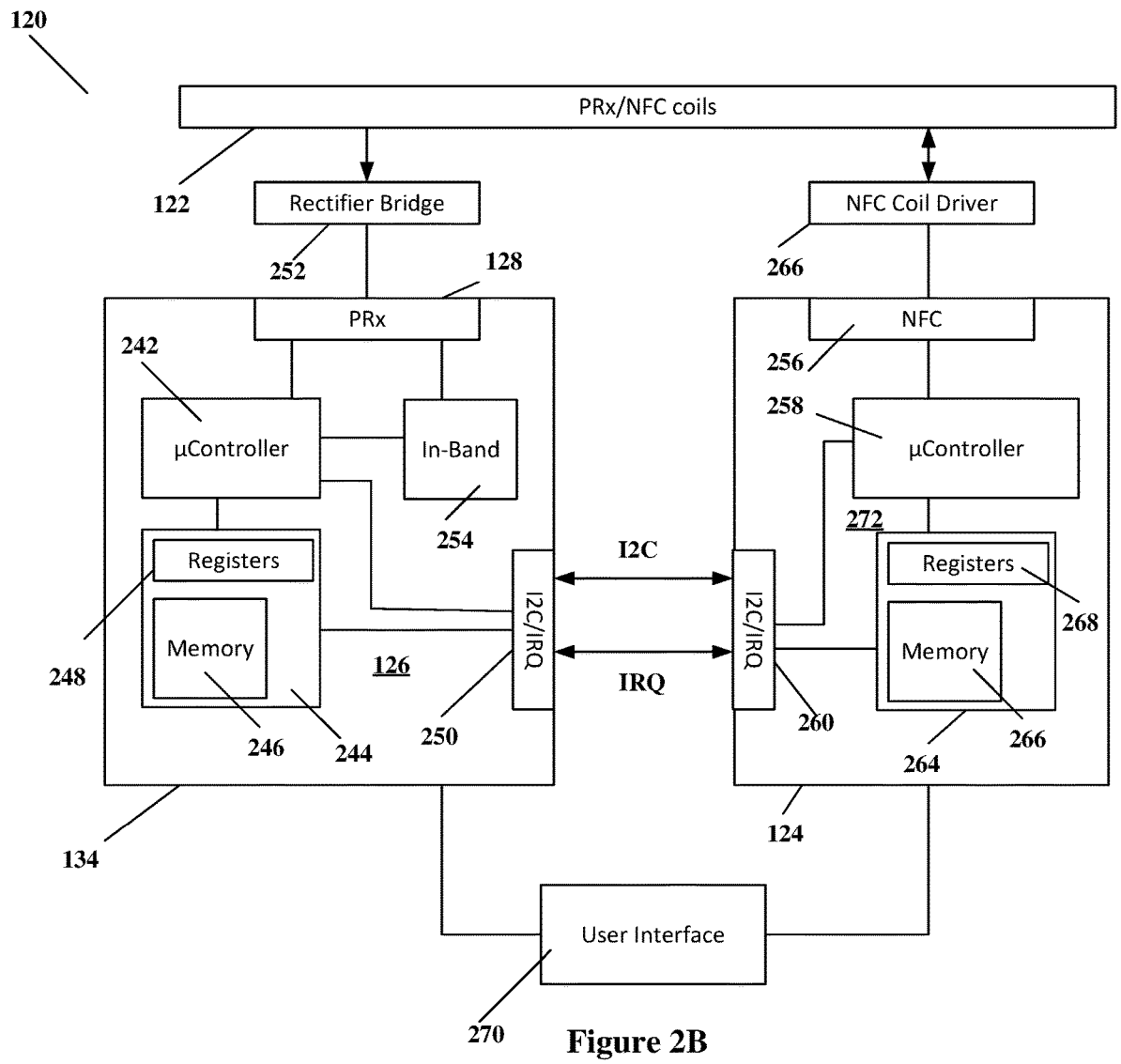
FIG. 2B illustrates in further detail some embodiments of a wireless power receiver as illustrated in FIGS. 1A and 1C.

FIG. 2B illustrates in further detail some embodiments of a PRx 120 as illustrated in FIGS. 1A and 1C. As illustrated, PRx 120 includes PRx/NFC coils 122 as discussed above coupled to a PRx driver 128, which is controlled by PRx SW processor 126, and NFC module 124. As discussed above, PRx driver 128 and PRx SW processor 126 can be formed on a single IC or may be separate components, but together forms PRx system 134.

PRx driver 128 of PRx system 126 is coupled through a rectifier bridge 242 that, under the control of PRx 128, receives wireless power signal 112 from PRx/NFC coils 112. As is further illustrated processor 126 includes a controller 242. Controller 242 can be any processor, including microcomputers, microcontrollers, programmable gate arrays (FPGAs), application specific integrated circuits (ASICs), digital signal processors (DSPs), or any other device that is capable of performing the functions described in this disclosure. Controller 242 is coupled to a memory module 244, which can include both volatile and non-volatile memory 246 for storing data and instructions. Further, memory module 244 includes registers 248, which may be separated from the memory of memory 246 or may be separate from memory 246.

Further, controller 242 may be coupled to an in-band communications 254. In-band communications 254 can send and receive data through wireless power signal 112. In-band communications 254 can, for example, send data by modulating the load on wireless power signal 112, which provides an amplitude modulation at PTx 102, and receive data by monitoring the frequency modulation of the transmitted wireless power signal 112.

Additionally, controller 242 may be coupled to a data bus, for example an I2C interface 250. Other data transmission systems may also be used, but for the purpose of example in this disclosure, the I2C protocol is disclosed. Additionally, system 134 can be interfaced to a user interface 270. User interface 270 may include other processors and a GUI that is part of, for example, a smart phone, laptop, tablet or other user device.

As is further illustrated in FIG. 2B, NFC module 124 includes a NFC soft controller 272 that includes a controller 258 and memory module 264. Controller 258 is coupled to an I2C interface 260. Consequently, NFC module 124 can communicate data with system 134 through I2C interface 260 and I2C interface 250. Controller 258 can be any processor, including microcomputers, microcontrollers, programmable gate arrays (FPGAs), application specific integrated circuits (ASICs), digital signal processors (DSPs), or any other device that is capable of performing the functions described in this disclosure. Controller 258 is coupled to a memory module 264, which can include both volatile and non-volatile memory 266 for storing data and instructions. Further, memory module 264 includes registers 268, which may be separated from the memory of memory 266 or may be separate from memory 266. Further, microcontroller 258 can be coupled through an NFC driver 256 to a NFC coil driver 266, which is coupled to PRx/NFC coils 120 to send and receive data. As is further illustrated in FIG. 2B, NFC module 124 may also be coupled to user interface 230.

As discussed above, processor 106 may receive communications from NFC module 104 through internal I2C communications on PTx 102. As discussed above, PTx system 116 may operate as a slave device. In FIG. 2A, then, NFC module 104 operates as a master device. In some cases, however, there may be an intermediate I2C processor between ISC interface 220 and ISC interface 210, in which case both NFC module 104 and PTx system 116 may operate as slave devices.

There may be several I2C interface message handling resources available. As discussed above, processor 106 of PTx system 116 may support I2C Slave mode only. In the configuration illustrated in FIG. 2A, NRC module 104 may operates as a master or there may be another I2C device that operates as master. If there is another device, then both system 116 and NRC module 104 operate as slave devices in the data transmission.

In either case, the I2C packets may follow EEPROM format with 7-bit device address and 16-bit memory address. For purposes of the following discussion, the configuration of FIG. 2A is discussed. One skilled in the art will recognize that another device besides NRC module 104 may be acting as master. In the configuration illustrated in FIG. 2A, two buffers in memory module 204 (the slave device) are used for Send/Receive messages. The size of these buffers may be, for example, 128 bytes each. Other buffer sizes may be used. There may be fixed or variable message sizes communicated between a master device (for example NFC module 104) and the PTx system 116 (operating as the slave) using I2C interface 220 and I2C interface 210. Control registers in registers 208 may also be employed and may contain information of message type, handshake information, interrupts, and interrupt clear information. There may be interrupt lines (IRQ) available in I2C interface 210 to signal to the master that a message is available. This may be an open drain register. There may also be an interrupt line IRQ to signal to the slave that a message has been written and ready for read. This may also be an open drain register.

There also is an I2C interface message handling protocol that is used between a master and a slave device. In Master-to-Slave transfer situations, the I2C protocol includes the following steps. Master (NRC module 104) writes the message to the Receive Buffer in memory module 204 of PTx system 116 and sets a bit in the control register of registers 208 to indicate that the message is pending. In some cases, Master (NRC module 104) pulls down the interrupt line IRQ to signal that the control register has been altered. The Master (NRC module 104) the polls the control register to check whether or not the message was processed. Meanwhile, Slave (PTx system 116) detects that a new message is pending and reads the message. Slave (PTx system 116) the clears the control register in registers 208. After clearing the control register, Master (NRC module 104) reads ZERO on polling, which is an indication that the message was processed. If the IRQ is used, Master (NRC module 104) the releases the Interrupt line (IRQ). Although some of these steps are optional, this protocol outlines transferring a message from NFC module 104 to PTx system 116 over I2C interfaces 210 and 220.

The I2C interface message handling protocol from the Slave (PTx system 116) to the Master (NFC Module 104) includes the following steps. Slave (PTx system 116) writes message to the Send buffer in memory 206. Slave (PTx system 116) then optionally writes help information to the control register. Slave (PTx system 116) then pulls down the interrupt signal line IRQ. Master (NRC module 104) detects assertion of the Interrupt signal IRQ when it is LOW. Master (NRC module 104) then reads the Send buffer and optionally reads the control register. Master (NRC module 104) then sets the control register to clear the asserted Interrupt IRQ. Slave (PTx system 116) detects the change to the control register, releases the Interrupt signal line and clears the control register. Master (NRC module 104) senses the Interrupt line going HIGH (and/or clearing of the control register), which is indication of process end.

Figure 3:
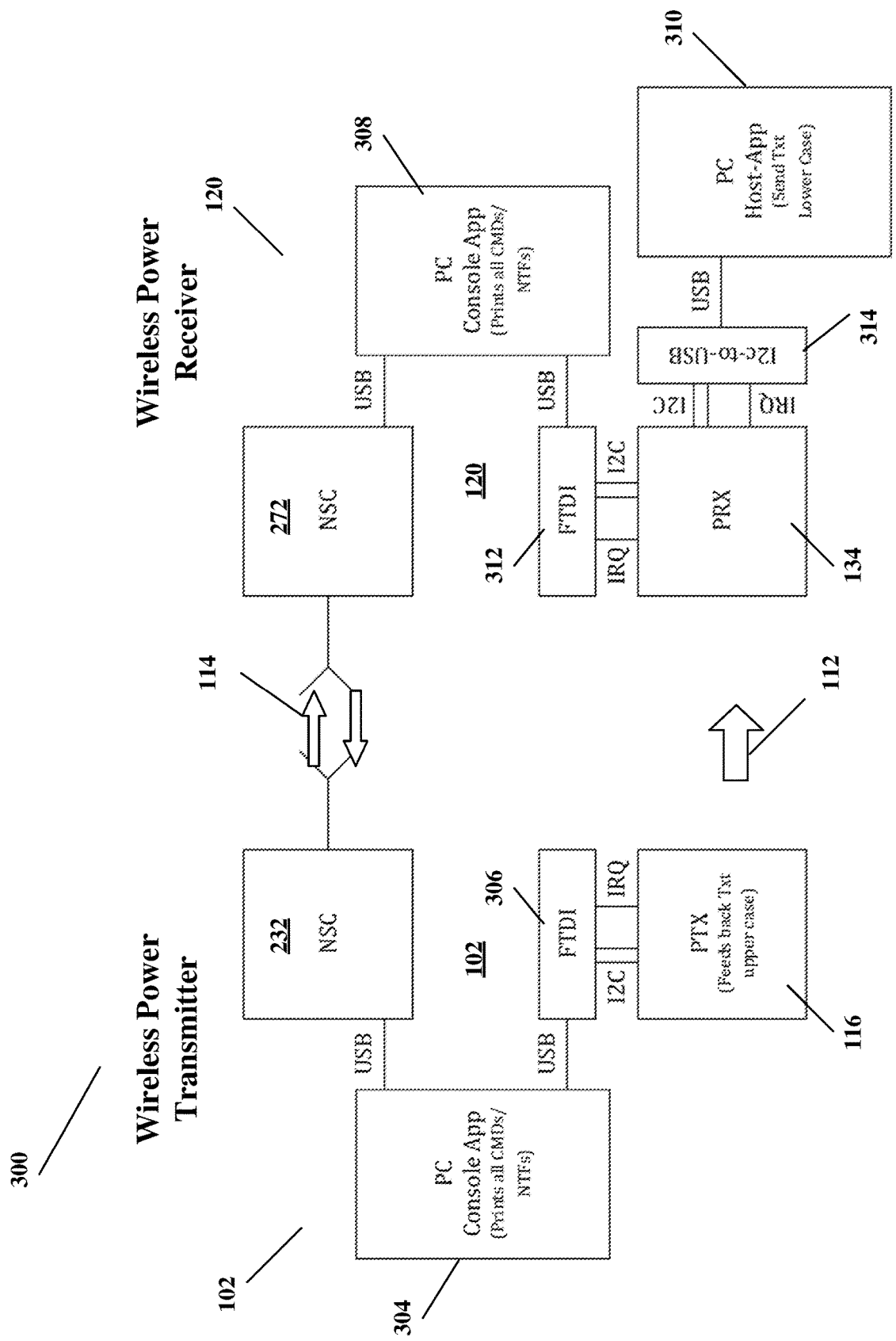
FIG. 3 illustrates a wireless power system 300 according to some embodiments.

FIG. 2 illustrates another example of system 300 that includes PTx system 116 and NFC module 104 of a wireless power system 102 in communications with PRx system 134 and NFC module 124 of wireless power receiver 120. In particular, FIG. 3 illustrates NSC 232 of NFC module 104 and NSC 272 of NFC module3 124. As illustrated in FIG. 3, PTx 102 and PRx 120 are configured for testing embodiments as described below.

As shown in FIG. 3, a computer 304 is inserted between NSC 132 and PTx system 116. Computer 304 can be any computer, tablet, or other device that can monitor and record interactions between NSC 232 and PTx 116. Computer 304 can, for example, be interfaced to NSC 232 through a Universal Serial Bus (USB) connection. Computer 304 can further be interfaced to a USB to I2C converter 306. Converter 306, for example, can be a Future Technology Devices International (FTDI) chip that interfaces between a USB connection and an I2C connection. As shown in FIG. 3, the I2C connection of converter 306 is coupled to I2C interface 210 of PTx system 116.

As is also illustrated in FIG. 3, a computer 308 is inserted between NSC 272 and PRx 134. Computer 308 can be any computer, table, or other device that can monitor and record interactions between NSC 232 and PTx 116. As is illustrated, computer 308 can be coupled with NSC 272 with a USB connection. Computer 308 is coupled to PRx 134 with a USB connection through converter 312. Converter 312, as discussed above with converter 306, is a USB to I2C converter and is coupled to I2C interface 250 of PRx system 134. A computer 310 can be coupled to PRx system 134 through a USB-to-I2C converter 314. In the testing, computer 310 provides the function of the user device in which a PRx device according to some embodiments is provided.

Figure 4A:
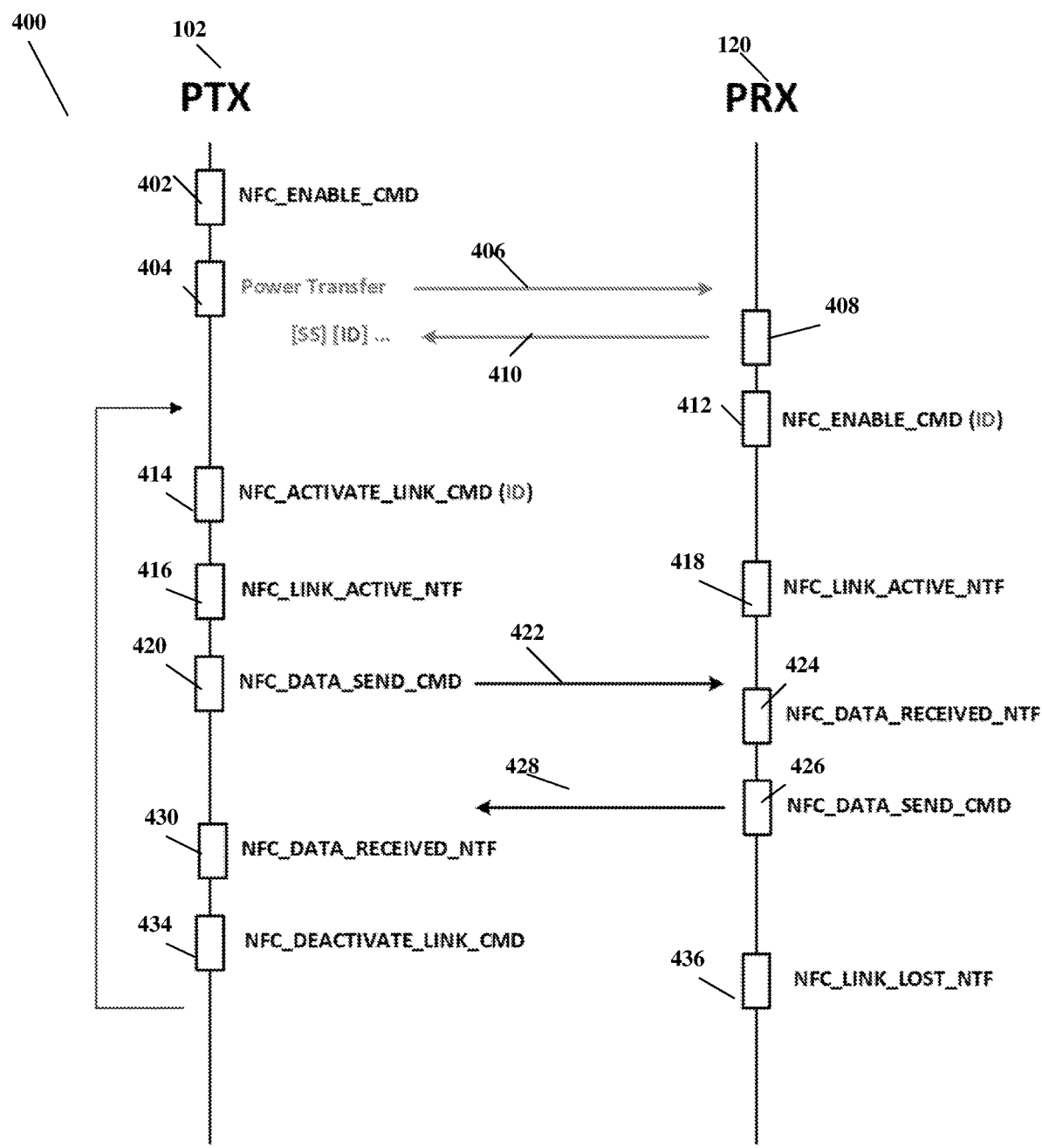
FIGS. 4A through 4C illustrates certain aspects of the communications protocols in the wireless power system illustrated, for example, in FIGS. 2A, 2B, and 3.

Aspects of the data flows and communications between PTx 102 and PRx 120, as monitored as illustrated in system 300 shown in FIG. 3, is illustrated in FIGS. 4A through 4C and FIGS. 5A through 5E. FIG. 4A illustrates the default communications 400 between PTx 102 and PRx 120. For simplicity, the operation of PTx 102 and PRx 120 are described separately below. Also, it should be kept in mind that, as discussed above, PTx system 116 and PRx system 134 issue commands and receive a status code indicating whether the command has been accepted or not. NSC 232 and NSC 272 issue status notifications to PTx system 116 and PRx system 134, as described further below. Further, the data flows illustrated present timing in a vertical fashion down the page.

As illustrated in FIG. 4A, PTx 102 starts in step 402, where PTx 102 enables NSC 232 of PTx 102 upon startup. NSC 232 starts a foreign card detection (FCD) when it is enabled in step 402. In step 404, PTx system 116 detects the presence of PRx 120, starts power transfer 406, and receives the identification of PRx 410 through in-band communications with PRx 120 in communications 410. In-band communication is described above with communications module 214 illustrated in FIG. 2A.

In step 414, PTx system 116 sends to NSC 232 the PRx ID received in step 404 to activate PRx NSC 272 in PRx 120. In step 416, the link between NSC 232 and NSC 272 is tested to determine whether it is good. In step 420, NSC 232 provides a data send command 422 to PRx 120 to transfer data to NSC 272 of PRx 120 with the NFC_Data_Send_CMD. Additionally, in step 430, NSC 232 can receive data from PRx 120 in data communications 428 with a similar NFC_DATA_SEND_CMD from PRx 120. During data transfer operations, FCD can be deactivated. In step 434, PTx system 116 can instruct NSC 232 to deactivate the NFC link process executing in PTx system 116 is returned to step 414. If the link has been activated and PTx 102 has nothing to send, it may still be the case that the PRx 120 wants to send data. Due to the half-duplex characteristic of the NFC link, NSC 232 of PTX 102 grants NSC 272 on of PRx 120 the permission to send, for example with by sending a token first.

As shown in FIG. 4A, PRx 120 operates with PTx 102. In step 408 of PRx 120, PRx 120 receives wireless power 406 and provides the PRx ID over in-band communications in communications 410. As discussed above, PRx system 134 provides in-band communications with in-band communications 254 as illustrated in FIG. 2B. In step 412, PRx 120 activates NSC 272 with the PRx ID transmitted in communications 410. In step 418, PRx 120 waits for an active link. Before PRx can send data, an active link must be determined in step 418. Data exchange is triggered with receipt of the NFC_DATA_SEND_CMD in step 424 from communications 422. Also in step 424, the data from PTx 102 is checked and verified and the NFC_DATA_RECEIVED_NTF is received. In step 426, data can be sent to PTx 102 with a NFC_DATA_SEND_CMD as well in communications 428. PRx 120 then moves to step 436, where the communications has completed and a NFC_LINK_LOST_NTF is provided in response to the deactivation initiated in step 434 of PRx 102.

If power is lost on PRx 120, NSC 272 moves to an NFC_OFF-state. A loss of power is detected by the PRX-NSC 272 by means of receiving NAKs on the I2C-interface with PRx 134. Once a power loss on the PRX 134 has been detected, the PRX-NSC 272 in state NFC_OFF starts an error-recovery process. The error-recovery process may perform an I2C-read operation of PRx 134 until a valid ACK is received on the I2C-address. After the first ACK has been read, the PRX-NSC 272 will wait a set time to give the PRX 134 enough time to initialize its memories properly. After that, the PRX-NSC 272 polls for the next command from the PRX 134 which is either NFC_ENABLE_CMD or a NFC_DISABLE_CMD.

Figure 4B:
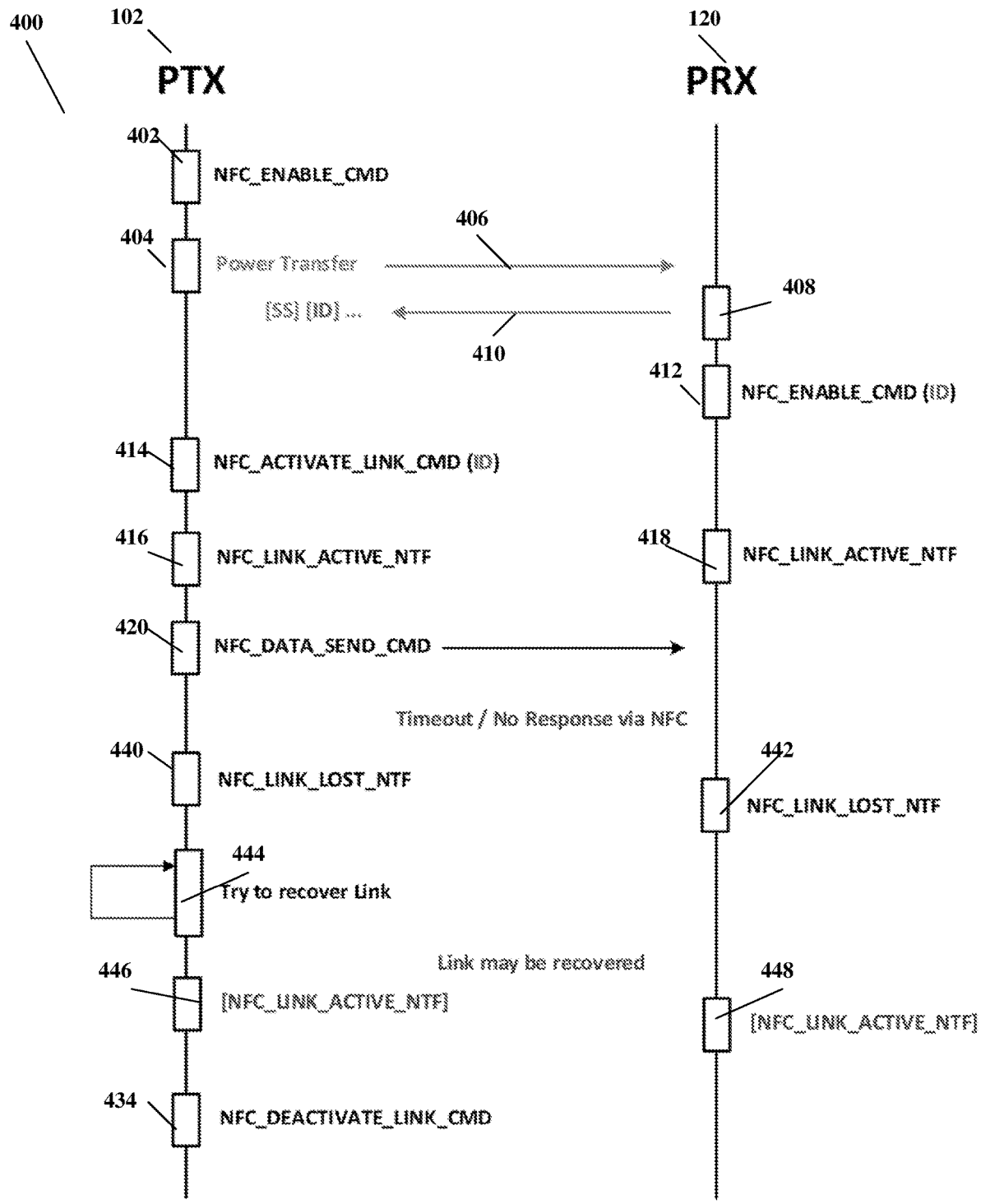

FIG. 4B illustrates communications protocol with an unexpected link loss. As illustrated in FIG. 4B, the communications protocol is as described in FIG. 4A until step 420 of PTx 102. After Step 420, there is a timeout resulting in PTx 102 determining in step 440 that the link is lost and sending from NFC 232 to PTx system 116 a NFC_LINK_LOST_NTF signal. Additionally, in PRx 120, NSC 272 also determines in step 442 that the link is lost and sends the signal NFC_LINK_LOST_NTF to PRx system 134. In step 444 operating on PTx 102, a repeated attempt may be made to recover the link between NSC 232 and NSC 272. If it is recovered, the NSC 232 can send an NFC_LINK_ACTIVE_NTF in step 446. Similarly, PRX 120 also determines an active link in step 448 and communicates the NFC_LINK_ACTIVE_NTF signal between NSC 272 and PRX system 134. At that point, PTx 102 may proceed to step 434 to deactivate the link and return to step 414 as illustrated in FIG. 4A.

Figure 4C:
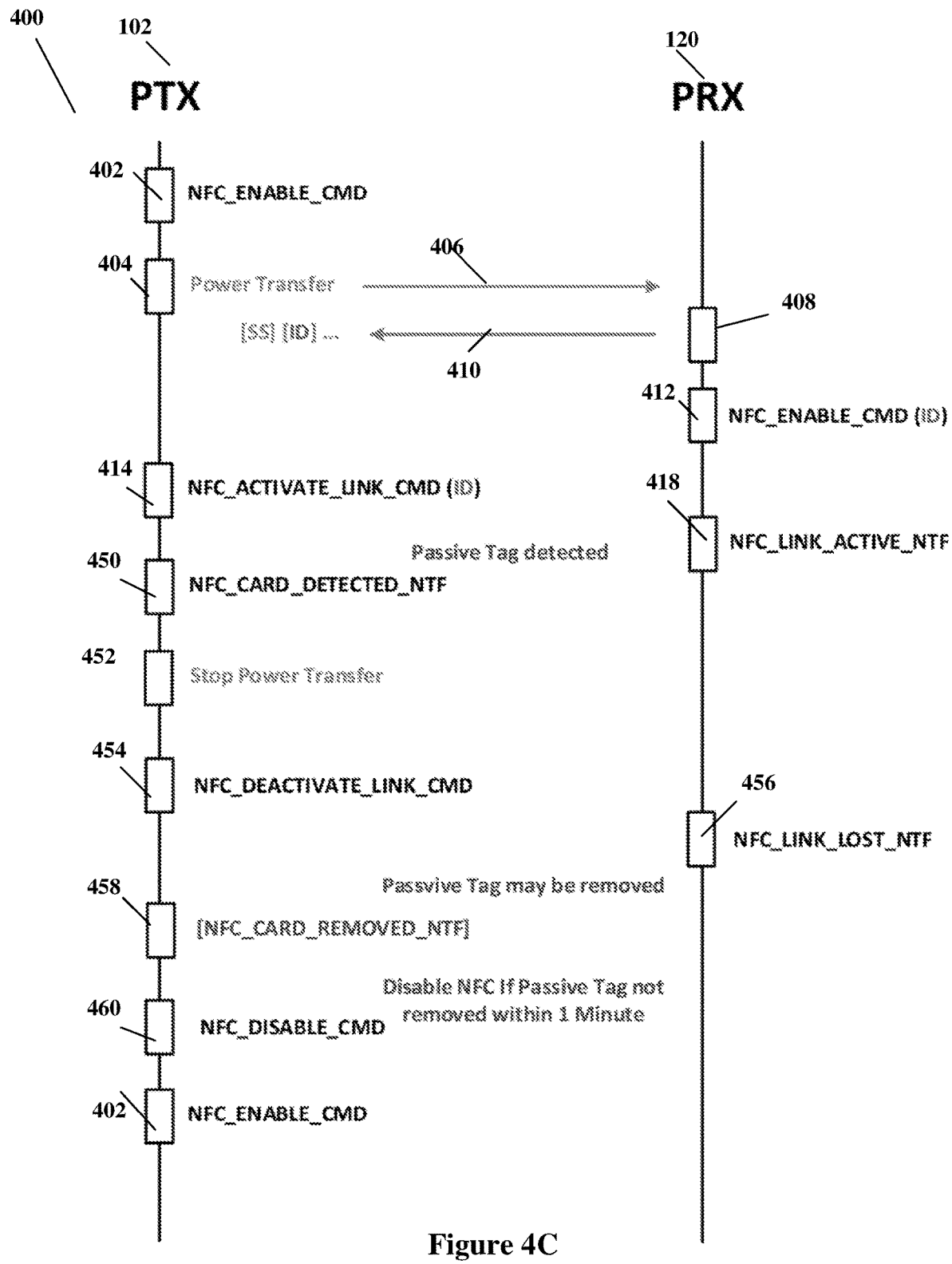

FIG. 4C illustrates communications protocol for when an NFC card is detected. As illustrated in FIG. 4C, the NFC card is detected after step 414 activating the Link. In step 452, PTx System 116 stops all power transfer. In step 454, the link is deactivated by PTx 102. In step 456, PRx 120 indicates a lost link. It should be noted that at this stage, NSC 232 is still active and NFC card detection is also active (in some cases, the card may be detected after step 402. In step 458, it is detected that the card has been removed. In step 460, PTx system disables NSC 232. After step 460, PTx 102 may again return to step 402 to enable NSC 232 and start over.

FIGS. 4A through 4C illustrate communications between PTx 102 and PRx 120, including some communications between NSC 232 and PTx system 116 as well as communications between NSC 272 and PRx 134. FIGS. 5A through 5E illustrate more closely communications NSC 232 and PTx system 116 as well as communications between NSC 272 and PRx 134 under certain conditions. As discussed above, communications between PTx 102 and PRx 120 are accomplished with an NFC link between NSC 232 and NSC 272. Communications between NSC 232 and PTx system 116 is accomplished with an I2C communications link. Communications between NSC 272 and PRx 134 is also accomplished with an I2C communications link. These links are illustrated and discussed in FIGS. 1A-1C, FIGS. 2A and 2B, and FIG. 3 above.

Figure 5A:
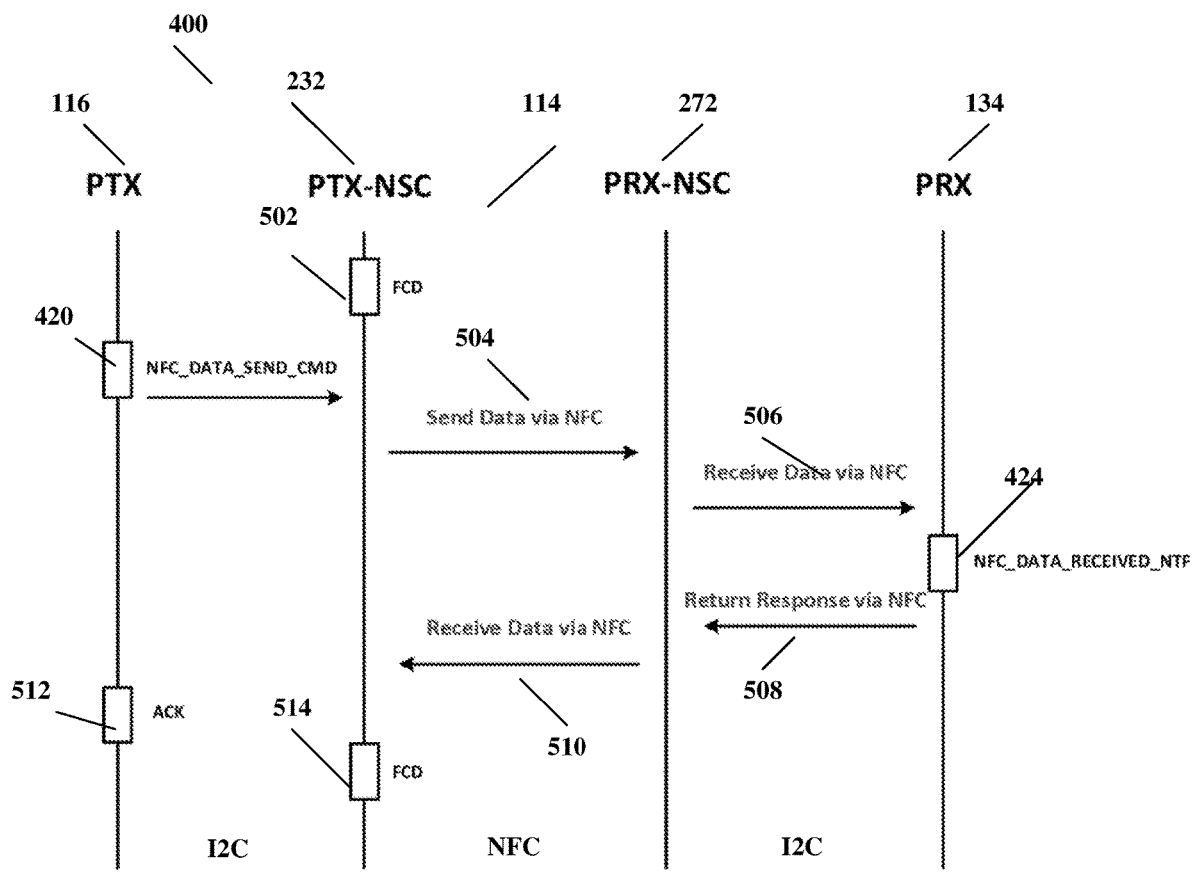
FIGS. 5A through 5E illustrate more closely aspects of the communications in certain situations.

FIG. 5A illustrates the communications protocol 400 for successful PTx data transfer. In step 502, NSC 232 performs a foreign card detection check. In step 420, PTx 116 system provides a NFC_DATA_SEND_CMD to NSC 232. As indicated, NSC 232 then transmits the data in NFC communications 504. NSC 272 receives the data in NFC communications 504 and transmits the received data through the I2C link to PRx system 134 in communications 506. PRx 134 executes step 424 and provides the NFC_DATA_RECEIVED_NTF command to provide a return response in communications 508. The data is then transmitted to NSC 232 in communications 510. In step 512 executed by PTx system 116, and ACK signal is generated indicating a successful data transfer. In step 514, NSC 232 once again executed a foreign card detection check.

Figure 5B:
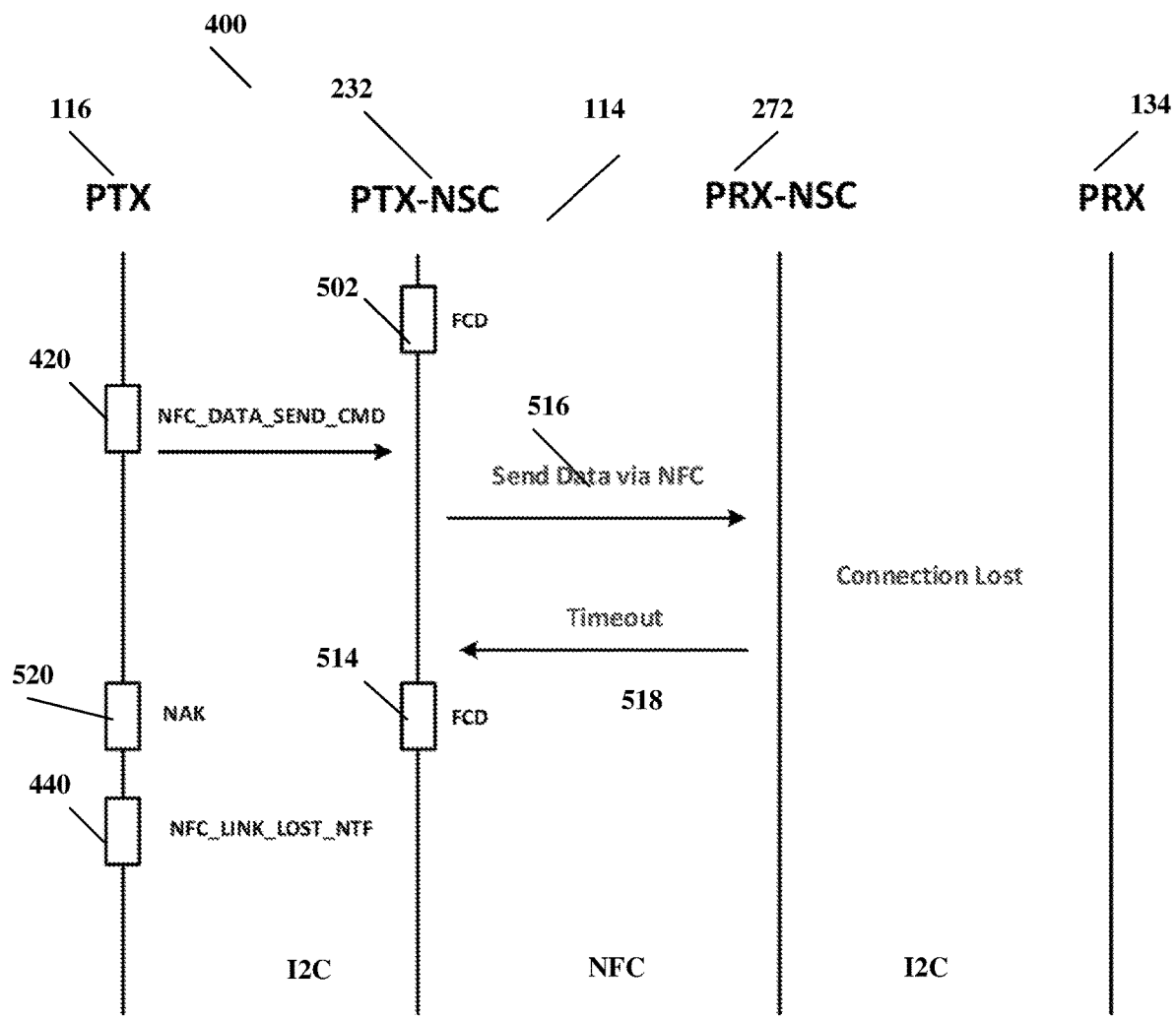

FIG. 5B illustrates the communications protocol when there is a PTx data transfer error. FIG. 5B specifically illustrates a lost connection between NSC 272 and PRx 134. As illustrated in FIG. 5B, in step 420 PTx 116 provides a NFC_DATA_SEND_CMD to NSC 232. Again, NSC 232 sends the data via NFC link 114 to NSC 272 in communications 516. However, as is illustrated, the connection between NSC 272 and PRx system 134 is lost. Consequently, a timeout communication 518 is provided. This results in step 520 where PTx system 116 receives a NAK signal and proceeds to step 440 to provide a NFC_LINK_LOST_NTF.

Figure 5C:
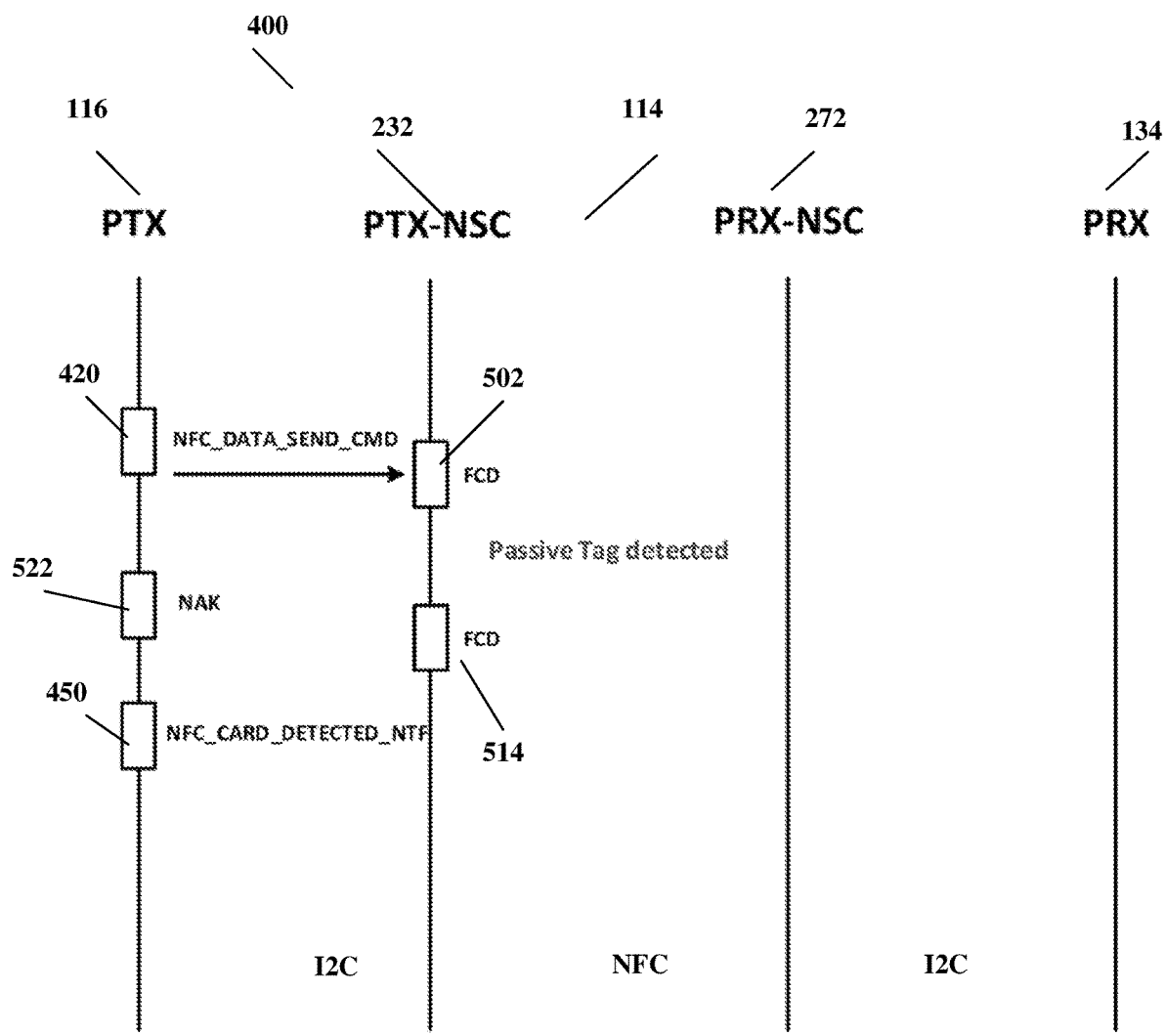

FIG. 5C illustrates the communications protocol for a card detection in a PTx data transfer protocol 400. As illustrated in FIG. 5C, PTx 116 provides an NFC_DATA_SEND_CMD to NSC 232. However, in this case card detection FCD 502 detects the presence of an NFC card. Consequently, no data is sent and a NAK is received by PTx 116 at step 522. PTx system 116 then provides an NFC_CARD_DETECTED_NTF signal.

Figure 5D:
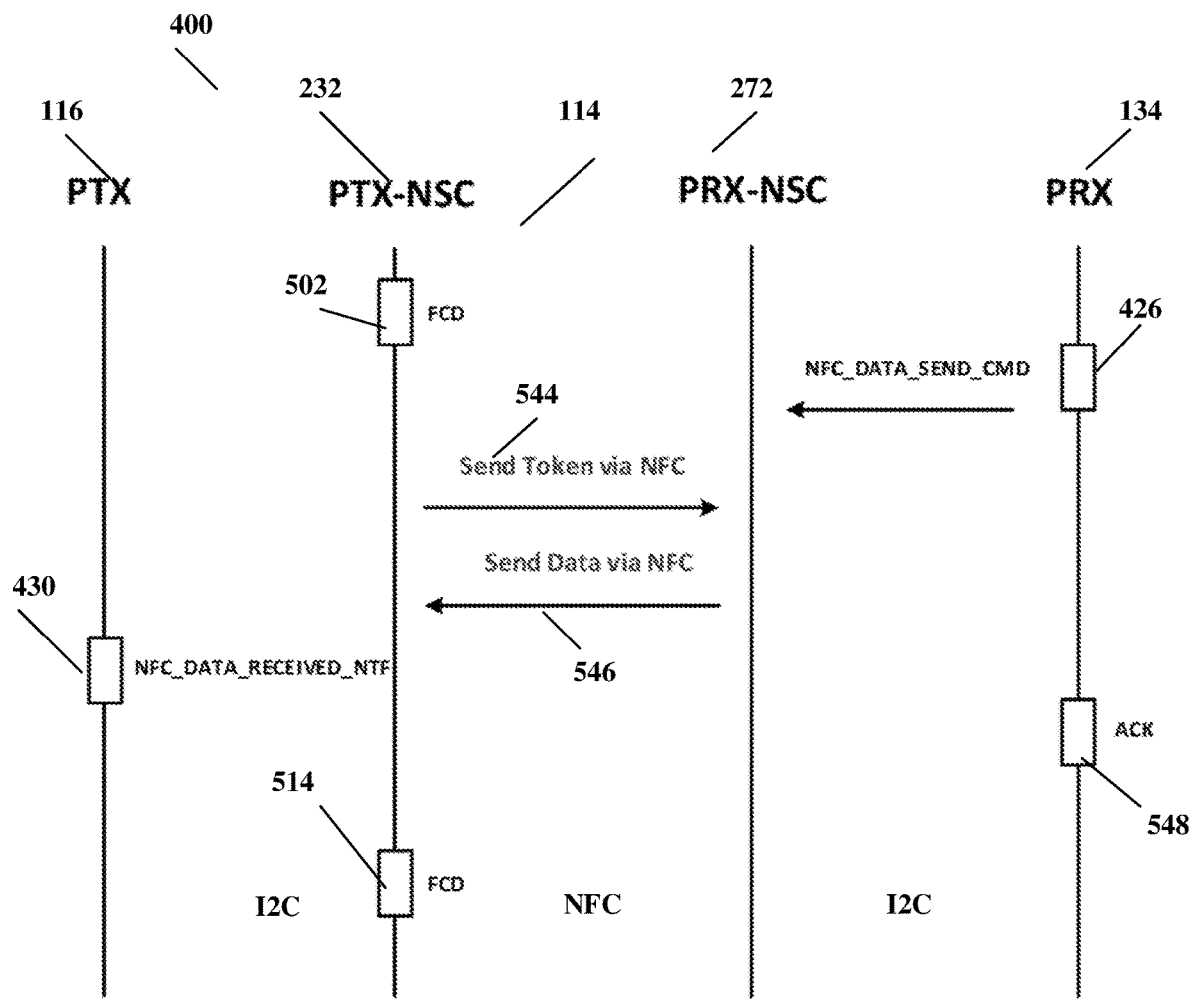

FIG. 5D illustrates the communications protocol for a successful PRx data transfer. As illustrated in FIG. 5D, PRx 134 provides an NFC_DATA_SEND_CMD in step 426. NSC 272 then requests a token from NSC 232 and receives the token in communications 544. The token grants NSC 272 permission to send data to NSC 232. NSC 272 then transmits the data in step 546. In step 430, PTx system 116 receives a signal NFC_DATA_RECEIVED_NTF. If successful, in step 548 PRx 134 receives an ACK signal. In some embodiments, retrieving a token may not be performed and NSC 272 can send data without receiving the token.

Figure 5E:
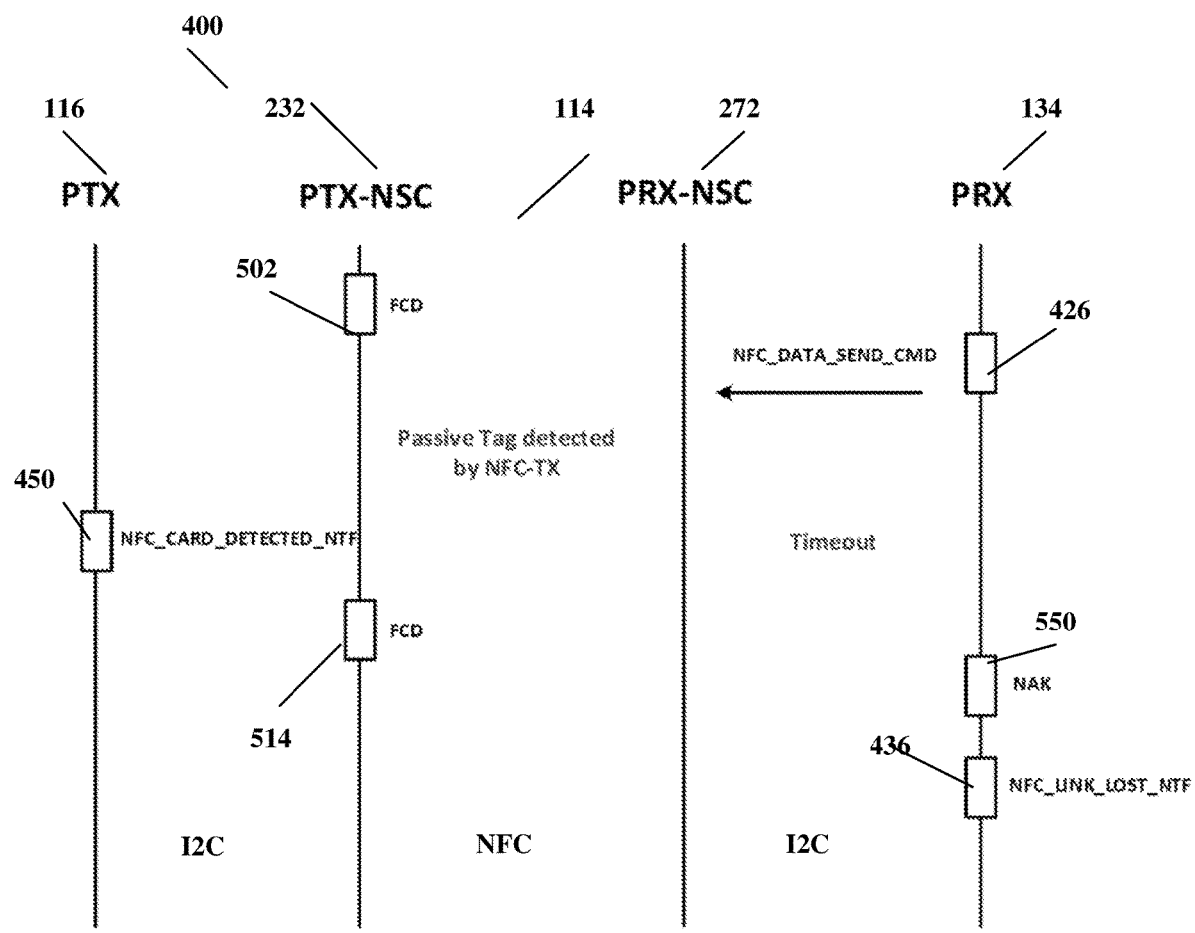

FIG. 5E illustrates PRx data transfer with a card detection error when PRx 120 is trying to send data. In this case, in step 426, PRx system 134 issues an NFC_DATA_SEND_CMD. However, in step 502, NSC 232 has detected a passive tag. As such, in step 450 PTx 116 has received a NFC_CARD_DETECTED_NTF as discussed above. Consequently, NSC 272 does not receive a token as discussed in FIG. 5D and NSC 272 is timed out and provides a NAK at step 550. Consequently, PRx 134 includes an NFC_LINK_LOST_NTF in step 436.

Figure 6:
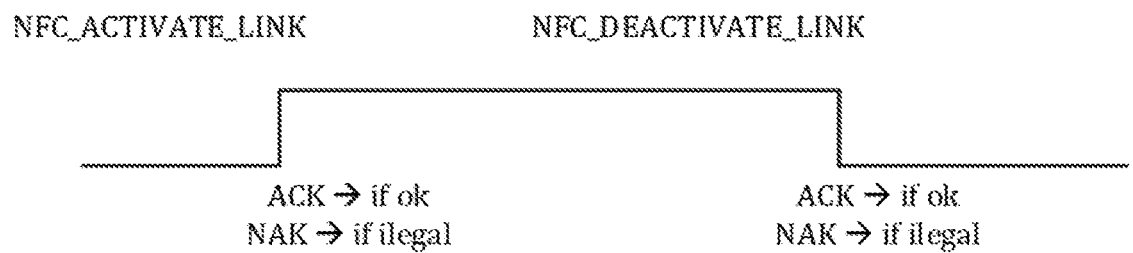
FIG. 6 illustrates active/de-active NFC links according to some embodiments.

FIG. 6 illustrates the NFC link activation flow in communications protocol. As is illustrated, a NFC_ACTIVATE_LINK is provided as a high signal. An ACK/NAK signal is provided depending on whether the activation is successful or not. Similarly, a NFC_DEACTIVATE_LINK signal is indicated by the transition from high to low. Again, an ACK/NAK signal is provided depending on whether the activation is successful or not.

As discussed above, commands and notifications between NSC 232 and PTx system 116 as well as between NSC 272 and PRx system 134 are exchanged by reading and writing buffers. For this reason, PTx system 116 and PRx system 134 each provides two buffers in memory modules 204 of PTx system 116 and memory module 244 of PRx system 134. These buffers may, for example, be 132 bytes each and includes one for transmission, one for reception.

Figure 7:
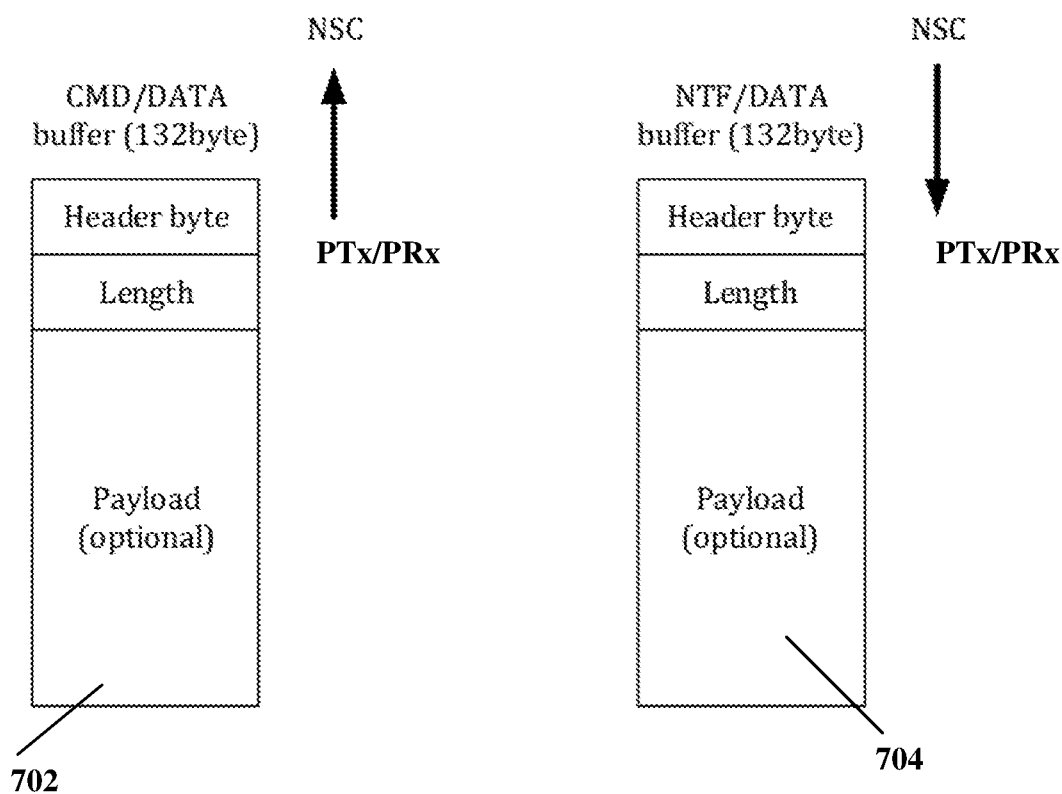
FIG. 7 illustrates buffers for communications between NSC and either a power transmitter system or power receiver system according to some embodiments.

FIG. 7 illustrates transmission buffer 702 and receipt buffer 704 as illustrated above. Each of memory module 204 and memory module 244 includes transmission buffer 702 and receipt buffer 704. As illustrated in FIG. 7, buffer 702 includes a header, length indicator, and optional payload. Similarly, buffer 704 includes a header byte, length, and optional payload. Each of the buffers 702 and 704 may be 132 bytes, although larger buffer sizes may be used.

When, for example, PTx system 116 wants to issue commands, it writes all data to the CMD/DATA buffer 702 of memory 204. Byte[0] is the header byte and identifies the command to execute. After writing the data into CMD/DATA buffer 702, the IRQ line is asserted in interface 210. On detection of the IRQ signal on the IRQ line, NSC 232 reads CMD/DATA buffer 702 from memory 204 and executes the requested action. To acknowledge (ACK) the command, NSC 232 writes 0x00 to the "Header byte" of CMD/DATA buffer 702 or writes another status code, as discussed below, into the header of CMD/DATA buffer 702. To avoid race conditions, PTx system 116 is only allowed to write to Byte[0] when the header is 0x00 or is one of the status codes illustrates in the status codes discussion below. Data and reporting transfer from NSC 232 to PTx system 116 operates with the mechanism in the opposite direction: NSC 232 writes data to the DATA/NTF buffer 704 in memory module 204, with one of the status codes as described below with respect to status codes. The communications between NSC 272 and PRx 134 is performed in the same way as is communications between NSC 232 and PTx 116 as described above.

In some embodiments, there are several Rules and Expected Behaviors that can be executed. In each case, a command is answered with a status code. For example, preceding supply of an error condition such as LINK_LOST, the previous command is answered with a NAK status code. Further, after a NFC_DEACTIVATE_LINK command has been replied to with an ACK or NAK status code, the communication buffers 702 and 704 are reset.

Each of PTx system 116 and PRx system 134 executes the following sequence with regard to communication handling: (1) Wait for the header byte (BUFFER(0)) of CMD/DATA buffer 702 to equal a status code as described below; (2) Provide a payload and length to CMD/DATA buffer 702 starting from BUFFER (1); (3) Write an OpCode into the header (BUFFER (0); and (4) Return to (1). In some embodiments, the IRQ line is asserted after step (3) to indicate a command is waiting.

Each of NRC 232 and NRC 272 executes the following sequence with regard to communication handling: (1) Wait for valid OpCode/Header in buffer 702; (2) Process the command; (3) Depending on the result of the processed command, write the status code into the header byte of buffer 702; and (4) Return to step (1). Similar, data may be transferred as discussed above by writing the status code, the length, and payload into buffer 704. Again, in some embodiments, an IRQ may be issued to indicate that a command is ready in buffer 702 or data is available in buffer 704.

Figure 8A:
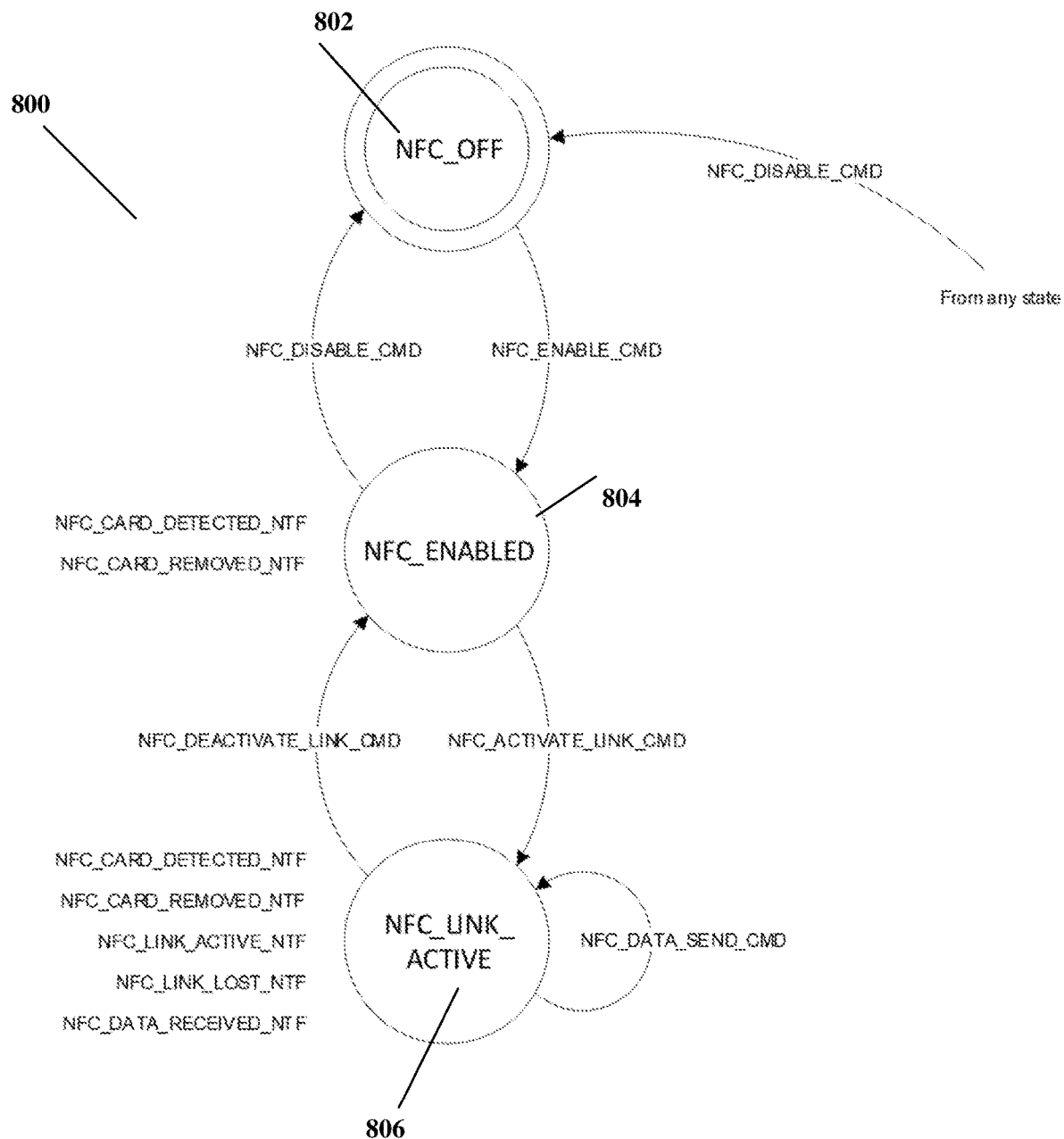
FIG. 8A illustrates the PTx command notification states.

FIG. 8A illustrates an example PTx 102 command and notification state diagram 800. FIG. 8A further indicates the commands that are issued between PTx 116 and NSC 134 and the status reporting from NSC 134 to PTx system 116. As illustrated in FIG. 8A, state diagram 800 includes three states: NFC_OFF state 802, NFC_ENABLED state 804, and NFC_LINK_ACTIVE state 806. As is illustrated, NFC off state 802 is entered when the command NFC_DISABLE_CMD is issued by PTx system 116 from any state. The NFC Enabled state 804 is entered into eather with a NFC_ENABLE_CMD from NFC_OFF state 802 or with a NFC_DEACTIVATE_LINK_CMD from NFC_LINK_ACTIVE state 806. In NFC_ENABLED state 804, NSC 134 may report NFC_CARD_DETECTED_NTF or NFC_CARD_REMOVED_NTF in response to identification of a card.

As is illustrated, NFC_LINK_ACTIVE state 806 can be entered into from NFC_ENABLED state 804 with an NFC_ACTIVATE_LINK_CMD from PTx system 116. As discussed above, NFC_LINK_ACTIVE state 806 can be exited with a NFC_DEACTIVATE_LINK_CMD, where the NFC_ENABLED state 804 is entered. A NFC_DATA_SEND_CMD is available in the NFC_LINK_ACTIVE state 806, where state diagram 800 remains in NFC_LINK_ACTIVE state 806. In the NFC_LINK_ACTIVE state 806, NSC 134 can provide the following status reports: NFC_CARD_DETECTED_NTF; NFC_CARD_REMOVED_NTF; NFC_LINK_ACTIVE_NTF; NFC_LINK_LOST_NTF; and NFC_DATA_RECEIVED_NTF.

Figure 8B:
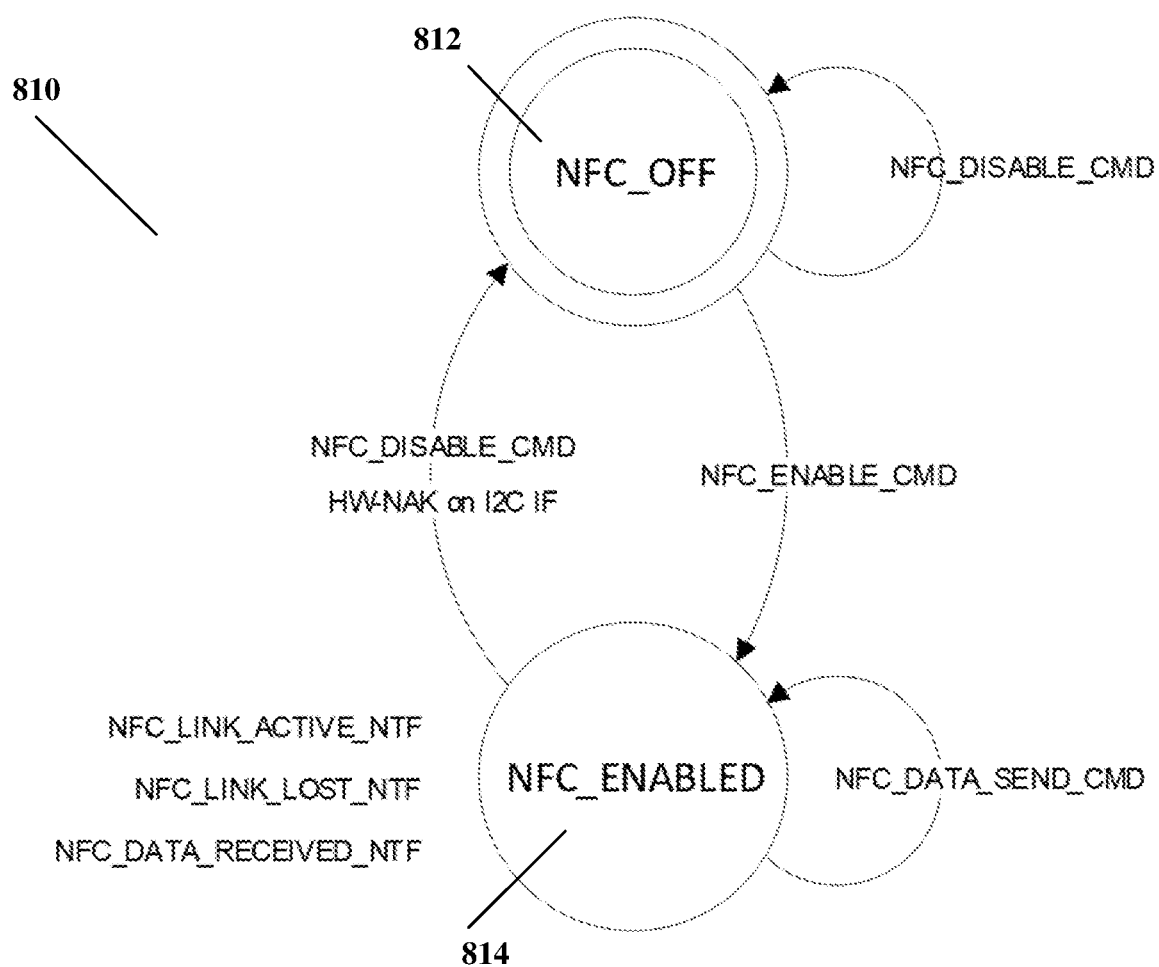
FIG. 8B illustrates the PRx command notification states.

FIG. 8B illustrates an example PRx state command and notification state diagram 810 that operates on PRx 120. As shown in FIG. 8B, state diagram 810 includes two states: NFC_OFF state 812 and NFC_ENABLED state 814. NFC_OFF state 812 is entered on startup and where a NFC_DISABLE_CMD is provided by PRx system 134. Such a command can be issued from NFC_OFF state 812 or NFC_ENABLED state 814. NFC_ENABLED state 814 is entered with a NFC_ENABLE_CMD from PRx system 134. From NFC_ENABLED state 814, PRx system 134 can issue a NFC_DATA_SEND_CMD. NSC 272 can provide a NFC_LINK_ACTIVE_NTF, NFC_LINK_LOST_NTF, or NFC_DATA_RECEIVED_NTF report.

The following description commands may be implemented in the state diagrams 800 and 810 as illustrated in FIGS. 8A and 8B. Each of the commands is illustrated in FIGS. 8A and 8B and discussed in FIGS. 4A through 4C as well as FIGS. 5A through 5E. The example command structures provided below are exemplary only and are not intended to be limiting. Other operational codes or data payload values and structures may be implemented.

NFC_ENABLE_CMD

The NFC_ENABLE_CMD can be issued by PTx system 116 or by PRx system 124, however the form of the command is different in each case. In PTx 802, this command can be issued in PTx system 116 in state 802 to enter NFC_ENABLED state 804 and may also be issued in either of states 804 and 806 because the enabling of the NFC system 124 has already been accomplished. The response to the NFC_ENABLE_CMD is one of the status signals indicated below (e.g. an ACK or NAK). In PTx system 116, the CMD/DATA buffer 702 of memory 204 can have the form:

| NFC_ENABLE_CMD (PTx system 116) | | |
|---|---|---|
| Header | Length | Payload |
| 0x01 | 0x01 | 1 Byte Protocol Version |

The NFC_ENABLE_CMD issued by PRx system 124 includes more data, including the PRx ID that is transmitted to PTx 102 either through an in-band communication or with the NFC communications. The command activates NFC service (configures NFC device, start Card Emulation) in NSC 272. This command is accepted (i.e. the status response is ACK) from state NFC_OFF state 812. The command is also accepted from NFC_ENABLED state 814 as the enabling of NFC was already performed in that state. In PRx system 134, the CMD/DATA buffer 702 of memory 244 can have the form:

| NFC_ENABLE_CMD (PRx system 134) | | |
|---|---|---|
| Header | Length | Payload |
| 0x01 | 0x08 | 1 Byte Protocol Version, 6 Bytes PRX_ID (2 byte PRMC + 4 byte Serial Number), and 1 byte CRC over PRX_ID (CRC = Seed(0xA5) + Protocol Version = sum of PRX_ID[0]-[6] |

NFC_DISABLE_CMD

The NFC_DISABLE_CMD can be issued by either of PTx system 116 or PRx system 134 and disables NFC in PTx 102 and PRx 120, respectively. As illustrated in FIG. 8A, the NFC_DISABLE_CMD can be issued by PTx 116 from any state and results in entry of the NFC_OFF state 802. As illustrated in FIG. 8B, the NFC_DISABLE_CMD can be issued from any state and results in entry of the NFC_OFF state 812. This command is accepted (i.e. response ACK) in the NFC_OFF state 802 of diagram 800 or state 812 of diagram 810, as the disabling of NFC was already performed. The CMD/DATA buffer 702 for either of PTx system 116 or PRx system 134 can have the form

| NFC_DISABLE_CMD (PTx system 116 or PRx system 134) | | |
|---|---|---|
| Header | Length | Payload |
| 0x02 | 0x00 | None |

NFC_ACTIVATE_LINK_CMD

The NFC_ACTIVATE_LINK_CMD is issued by PTx system 116 and starts establishment of NFC link to a peer device, e.g. PRx 120 with given PRX_ID number. The command is issued in NFC_Enabled state 804 illustrated in FIG. 8A to transition state diagram 800 to the NFC_LINK_ACTIVE state 806. If the connection to the peer device is lost, an NFC_LINK_LOST notification will be generated. In this state, the NFC device will try to reestablish the link (this process can be stopped by sending a NFC_DEACTIVATE_LINK_CMD). The command is also accepted (i.e. response ACK) in state NFC_LINK_ACTIVATE, as the activation of the link was already done. Responses are provided in the status table below. The command may be issued upon entry of a Power Transfer phase of PTx system 116. The CMD/DATA buffer 702 of PTx 116 can have the form

| NFC_ACTIVATE_LINK_CMD (PTx system 116) | | |
|---|---|---|
| Header | Length | Payload |
| 0x03 | 0x06 | 6 Bytes PRX-ID (2 byte PRMC + 4 byte Serial Number) |

NFC_DEACTIVATE_LINK_CMD

The NFC_DEACTIVATE_LINK_CMD can be issued by PTx system 116 to stop communication with peer device to which the NFC link was established. The command is issued in the NFC_LINK_ACTIVE state 806 to transition state diagram 800 to NFC_ENABLED state 804. This command can also be accepted (i.e. response ACK) in the NFC_OFF state 802 and NFC_ENABLED, as the deactivation of the link is done on those states. The FCD is continued after the command. The command can be issued upon exit of a power transfer phase of PTx system 116. The CMD/DATA buffer 702 of PTx 116 can have the form

| NFC_DEACTIVATE_LINK_CMD (PTx system 116) | | |
|---|---|---|
| Header | Length | Payload |
| 0x04 | 0x00 | None |

NFC_DATA_SEND_CMD

The NFC_DATA_SEND_CMD initializes transmission of data and can be issued by PTx system 116 when in NFC_LINK_ACTIVE state 806 and can be issued by PRx system 134 when in NFC_ENABLED state 804. The response is given by the status codes below (ACK or NAK). The CMD/DATA buffer 702 of PTx system 116 or PRx system 134 can have the form

| NFC_DATA_SEND_CMD (PTx system 116 or PRx system 134) | | |
|---|---|---|
| Header | Length | Payload |
| 0x05 | Length (e.g., 0-128) | Payload data |

As discussed above, whenever PTx system 116 or PRx system 134 issues a command, the corresponding NSC 232 of PTx 102 or NSC 272 of PTx 120 writes a status code into the header4 of the corresponding CMD/DATA buffer 702. These status code indicates whether an error has occurred or whether the command was accepted by the corresponding NSC 232 or NSC 272. The status codes can be given by

| Status | Header Code (CMD/DATA buffer 702) |
|---|---|
| ACK—Command Accepted | 0x00 |
| NAK—Generic Error | 0xFF |
| NAK—Not Supported | 0xFE |
| NAK—Invalid State | 0xFD |

The Status codes are different values from opcodes of the commands that may be issued and consequently are easily distinguished from those opcodes. In that way, PTx system 116 and PRx system 134 can determine whether or not a command has been received and whether or not the command has been accepted.

As is further discussed above, NSC 232 and NSC 272 can issue status notifications. These status notifications are issued by writing into NTF/DATA buffer 704. NSC 232 writes into NTF/DATA buffer 704 of memory 204 in PTx system 116. NSC 272 writes into NTF/DATA buffer 704 of memory 244 of PRx system 134. The status notifications used illustrated in state diagram 800 of FIG. 8A and state diagram 810 of FIG. 8B are discussed below.

NFC_LINK_ACTIVE_NTF

The NFC_LINK_ACTIVE_NTF notification can be issued from NSC 134 to PTx system 116 or from NSC 272 to PRx system 134. Notification occurs when a peer device with a given PRX_ID has been found. The NTF/DATA buffer 704 of either PTx system 116 or PRx system 134 can have the form

| NFC_LINK_ACTIVE_NTF (NSC 232 or NSC 272) | | |
|---|---|---|
| Header | Length | Payload |
| 0x21 | 0X00 | None |

NFC_LINK_LOST_NTF

The NFC_LINK_LOST_NTF notification can be issued by NSC 232 to PTx system 116 or from NSC 272 to PRx system 134 when the existing link to the peer device with the given PRX_ID cannot be established anymore. The NTF/DATA buffer 704 of either of PTx system 116 or PRx system 134 can have the form

| NFC_LINK_LOST_NTF (NSC 232 or NSC 272) | | |
|---|---|---|
| Header | Length | Payload |
| 0x22 | 0X00 | None |

NFC_CARD_DETECTED_NTF

The NFC_CARD_DETECTED_NTF notification is issued from NSC 232 to PTx system 116 when a card 132 (not mobile receiver 120) was detected in the NFC field. The NTF/DATA buffer 704 of PTx system 116 can have the form

| NFC_CARD_DETECTED_NTF (NSC 232) | | |
|---|---|---|
| Header | Length | Payload |
| 0x23 | 0X00 | None |

NFC_CARD_REMOVED_NTF

The NFC_CARD_REMOVED_NTF notification is issued from NFC 232 to PTx system 116 when a previously detected card 132 (not a mobile receiver 120) was removed from the NFC field. The NTF/DATA buffer 704 of PTx system 116 can have the form

| NFC_CARD_REMOVED_NTF (NSC 232) | | |
|---|---|---|
| Header | Length | Payload |
| 0x24 | 0X00 | None |

NFC_DATA_RECEIVED_NTF

The NFC_DATA_RECEIVED_NTF notification is issued by NSC 232 to PTx system 116 or by NSC 272 to PRx system 134 when data was received from the PRX 120 or PTX 102 via the NFC-link. The NTF/DATA buffer 704 of either of PTx system 116 or PRx system 134 can have the form

| NFC_DATA_RECEIVED_NTF (NSC 232 or NSC 272) | | |
|---|---|---|
| Header | Length | Payload |
| 0x25 | Length (e.g. 0-128) | Payload data |

NFC_STARTING_NTF

The NFC_STARTING_NTF notification is issued by NSC 232 to PTx system 116 or by NSC 272 to PRx system 134 when NFC software is (re)starting. PTx 116 or PRx 134 goes to the NFC_OFF state 802 or the NFC_OFF state 812 and sends the NFC_ENABLE_CMD. The NTF/DATA buffer 704 of either of PTx system 116 or PRx system 134 can have the form

| NFC_STARTING_NTF (NSC 232 or NSC 272) | | |
|---|---|---|
| Header | Length | Payload |
| 0x26 | 0x00 | None |

Device addresses can be assigned to each of PTx system 116 and PRx system 134. For example, PTx system 116 can have device address 0x61 while PRx system 134 can have device address 0x3B. However, any sets of device addresses can be used.

Given the discussion above, a particular implementation of NFC communications between PTx 102 and PRx 120 in a wireless power system 100 is illustrated in FIG. 1C. As discussed above, a PTx 102 communicates through an NFC link 114 with a PRx 120. Further, PRx 120 is in communications with a user interface GUI 130. As discussed above, PRx 120 and GUI 130 may form a mobile device such as a smart phone, tablet, or personal computer.

Embodiments of the present invention allow for a connection between GUI 130 and PTx 102, and particularly between GUI 130 and PTx system 116 of PTx 102. Any number of commands can be implemented, for example Copy, Modify, Save and ReadBack commands can be performed. Copy and Modify commands, for example, can send up to 124 bytes of data from the GUI 130 to the PTx 102. In accordance with embodiments of the present invention, PTx 102 automatically sends the data back to GUI 130. The difference between the Copy and the Modify commands is in Modify mode PTx 102 inverts a bit, for example BITS, in the data bytes before sending the data back.

Save command can work on sizable data blocks, for example up to 1 kB. GUI 130 can send chunks of data (up to 124 bytes each), and the PTx 102 saves these chunks in its buffer at the specified offset. ReadBack command requests the PTX to send the data in its buffer back to GUI 130. In that case the PTx 102 has to partition the data (send chunks up to 124 bytes each) if the requested size is larger than 124 bytes.

As discussed above, the NFC link is activated by default during the Power Transfer Phase—there is no provision for PRX-PTX handshaking to decide whether to activate the link or not. The PRX activates the link after an LDO ON event. This ensures the NFC circuitry is powered up before issuing the first command. The PTX activates the link with some delay (~500 ms) after entering Power Transfer Phase, and deactivates the link upon removal of the supply power.

As discussed above, the data is transmitted between PRx system 134 that is coupled with GUI 130, for example through an I2C interface, and NSC 272 with the I2C data bus. The command is encoded as data in the NFC_DATA_SEND_CMD. The data is then sent through the NFC link to NSC 232 of PTx 102 and transmitted to PTx 116 using the NFC_DATA_RECEIVED_NTF notification. Similarly, data is transmitted from PTx system 116 to GUI 130 by including the data in a NFC_DATA_SEND_CMD between PTx system 116 and NSC 232, transmitting the data through the NFC link 114, and using the NFC_DATA_RECEIVED_NTF notification to transmit the data between NSC 272 and PRx system 134. Below, the NFC link is further discussed.

The data that is communicated between GUI 130 and PRx system 116 is packed in three formats throughout the communication path. The data passed between GUI 130 and the PRx system 116 is independent from the hardware (HW) interface. The data packet includes a header and usable data. The header contains control information of how the data is to be used. The header types and their associativity with each demo mode are described below. The total size of packet (header+user data) may, for example, be limited by the channel to 128 bytes, which allows for packing within 132 byte buffers 702 and 704 as discussed above with FIG. 7.

FIG. 9A illustrates a mirror mode of operation 900. In this mode PRx system 116 sends back the data that it has received without any change. The delay is minimal between receiving data and sending it back. The data size does not include the header so that the packet itself is 128 bytes. As illustrated in FIG. 9A, data packet 902 illustrates the data that is transmitted between GUI 130 and PTx system 116 while data packet 904 illustrates the identical data that is mirrored back from PTx system 116 and GUI 130. The header code for this transmission can be, for example, 0x01 and the data payload size is up to 124 bytes.

FIG. 9B illustrates a modify mode of operation 910. In the modify mode PTx system 116 modifies the data by inverting BITS of the payload data before sending the data back to GUI 130. The delay is minimal. As illustrated in FIG. 9B, modify mode of operation 910 illustrates a packet 912 that is transmitted from GUI 130 to PTx system 116 as discussed above. Packet 914 is transmitted from PTx system 116 to GUI 130 and is identical with packet 912 except that one bit (for example bit 5) is inverted. The header code for this transmission can be, for example, 0x02 and the data payload size is up to 124 bytes.

The mirror mode of operation 900 illustrated in FIG. 9A and the modify mode of operation 910 illustrated in FIG. 9B are useful for testing wireless power system 100 to insure that data is being transferred correctly. Testing system 300 illustrated in FIG. 3 can be used to test each aspect of the communications between host computer 310 (GUI 130) and PTx system 116.

Figure 9C:
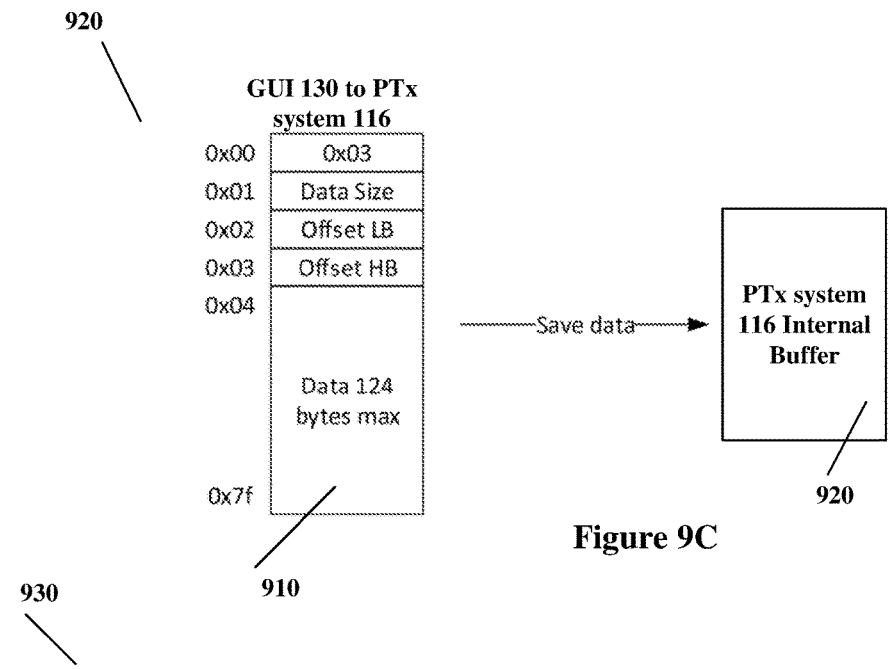

FIG. 9C illustrates a save data mode of operation 920. In save data mode 920, GUI 130 sends a large chunk of data, for example up to 1 kB of data, to a buffer 920 in the PTx system 116. Buffer 920 is, for example, included in memory 204 of PTx system 116. GUI 130 partitions the data to fit within the size limitations of the communication packets. The partitioning size is not fixed. Neither is the start offset. It is allowable to send overlapping data. As shown in FIG. 9C, packet 910 includes the header code 0x03 and LB offset and HB offset where the data in the payload is to be written into buffer 920. Buffer 920 may be cleared if data packet 910 sets the received Offset to ZERO, and then writes the received data with specified size. It is possible to use this command with size ZERO and Offset ZERO only to clear buffer 920. In some embodiments, PTx system 116 can verify that the received data is not overflowing the buffer size of buffer 920 and, if it is, ignore that data.

Figure 9D:
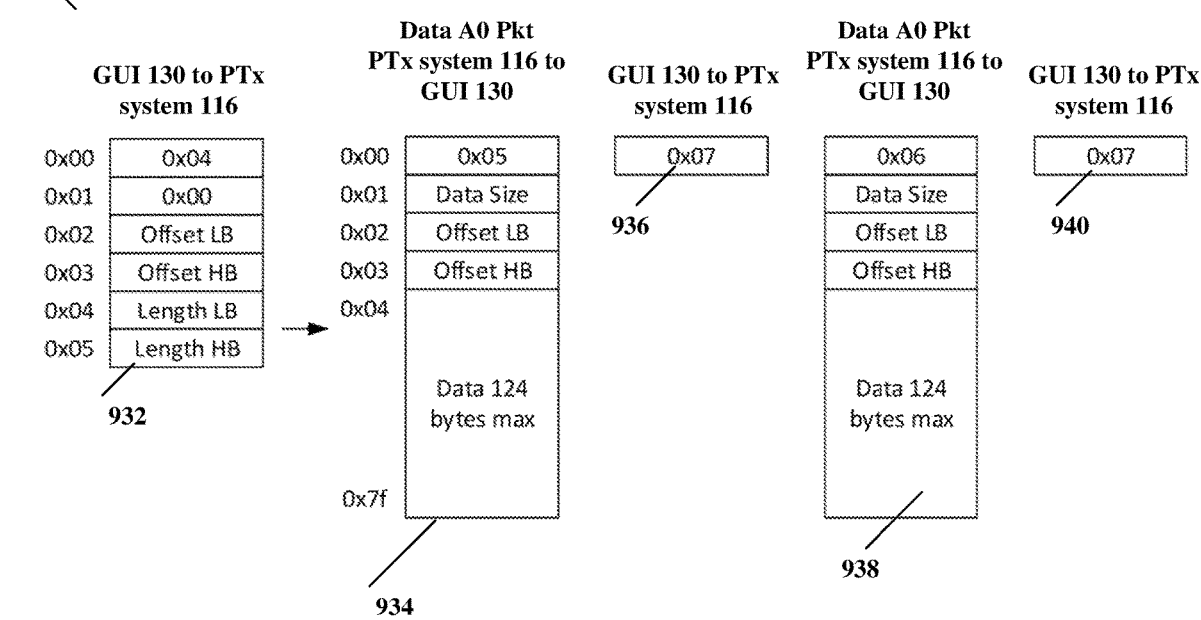

FIG. 9D illustrates a read back sequence 930. As illustrated, GUI 130 sends packet 932 with a command to request a read back data from buffer 920. As illustrated, the header command code is 0x04 and offsets and lengths are specified. PTx system 116 replies a series of packets with alternating DATA0 and DATA1 headers (header command codes 0x05 and 0x06). Each packet is acknowledged before sending the next packet. The number of packets depends on the requested data lengths. In operation, PTx system 116 generates the next packet in the sequence as soon as the acknowledgment of receipt of the previous packet is received. There is no special information about first and last packet. It is up to GUI 130 to decide when the requested data is completely received.

As is illustrated in FIG. 9D, PTx system 116 generates two types of packets when replying to the Read Back Command: DATA0 packet 934 with header 0x05, and DATA1 packet 938 with header 0x06. Except for the header, the two DATA type packets are identical in format with packet 910 illustrated in FIG. 9C. The packet sequence starts always with DATA0 packet 923 followed with DATA1 packet 938. The sequence can repeat as many times as necessary to transmit all of the requested data. Each DATA packet 923 or 938 is acknowledged before sending the next one. PRx system 116 can implement a time out (e.g., ~500 ms) and resend the last packet if an ACK was not received. As shown in FIG. 9D, the ACK packets 936 and 940 are transmitted from GUI 130 to PRx system 116 upon receipt of each of packets 934 and 938. ACK packets 936 and 940 only contain a header with header code 0x07.

The above detailed description is provided to illustrate specific embodiments of the present invention and is not intended to be limiting. Numerous variations and modifications within the scope of the present invention are possible. The present invention is set forth in the following claims.

What is claimed is:

1. A wireless power transmitter, comprising:
  a power transmitter system coupled to a transmitter coil to provide wireless power to a power receiver, the power transmitter system includes a power transmit driver coupled to the transmit coil, an in-band communication coupled to the power transmit driver to send and receive data on the wireless power, a transmitter controller coupled to the power transmit driver and the in-band communication, and a first interface coupled to the transmitter controller; and
  a near-field communications (NFC) module having an NFC driver coupled to a nearfield coil to communicate with a receiver NFC module of the power receiver, an NFC controller coupled to the NFC driver, and a second interface coupled to the NFC controller, the second interface configured to communicate through the first interface with the power transmitter system;
  wherein the NFC controller operates the NFC module in a NFC OFF state, a NFC ENABLED state, or a NFC ACTIVE state, where transition between the NFC OFF state and the NFC ENABLED state and transition between the NFC ENABLED state and the NFC ACTIVE state are controlled by the NFC controller in response to one or more commands from the transmitter controller of the power transmitter system, the NFC module being configured to transmit data to the receiver NFC module of the power receiver or receive data from the receiver NFC module when in the NFC ACTIVE state,
  wherein the transmitter controller of the power transmitter system is configured to direct the power transmitter driver to transfer power through the transmit coil to the power receiver, receive a power receiver ID from the power receiver using the in-band communication, and to transition the NFC module from the NFC Enabled state to the NFC ACTIVE state with the one or more commands,
  wherein when the NFC controller operating the NFC module in the NFC ACTIVE state receives a data send command from the power transmitter system, the NFC controller directs the NFC driver to provide data to the power receiver in response to the data send command and receive response data from the power receiver, wherein the data and the receive response data is related to wireless power transfer between the power transmitter system and the power receiver, the data and the response data including one or more of power transfer power control data, system information data, and authentication data, and wherein the NFC controller of the NFC module of the wireless power transmitter is configured to detect presence of an NFC card in the absence of the power receiver and to communicate with the power transmitter system through the second interface and first interface to prevent wireless power transfer by the power the transmitter system when the NFC card is detected.

2. The wireless power transmitter of claim 1, wherein the second interface of the NFC module is an I2C interface and the power transmitter system communicates with the near-field module with the I2C interface.

3. The wireless power transmitter of claim 1, wherein the power transmitter system is configured to receive data and instructions through the NFC module from the power receiver.

4. The wireless power transmitter of claim 3, wherein the instructions include instructions to save, modify, or read data stored in the power transmitter system.

5. A wireless power system, comprising a wireless power transmitter that includes a power transmitter system that includes a power transmit driver coupled with a transmission coil, an in-band communication coupled to the power transmit driver to send and receive data on the wireless power, a transmitter controller coupled to the power transmit driver and the in-band communication, and a first interface coupled to the controller, the power transmitter system in communication through the first interface with a transmitter near-field communications (NFC) module, the transmitter NFC module having an NFC driver coupled to a near field communications coil, an NFC controller coupled to the NFC driver, and a second interface coupled to the NFC controller to communicate with the transmitter controller through the first interface of the wireless power transmitter, wherein the NFC controller of the transmitter NFC module operates in a NFC OFF state, a NFC ENABLED state, or a NFC ACTIVE state, where transition between the NFC OFF state to the NFC ENABLED state and transition between the NFC ENABLED state to the NFC ACTIVE state are controlled based on one or more commands from the power transmitter system received through an interface of the transmitter NFC module, the transmitter NFC module being configured to transmit data when in the NFC ACTIVE state;

a wireless power receiver that includes a power receiver system coupled with a receiver coil, the power receiver system in communication with a receiver NFC module coupled through a receiver NFC driver with a receiver near field communications coil, wherein the transmitter controller of the power transmitter system is configured to transfer power through the power transmit driver, receive a power receiver ID from the wireless power receiver using the in-band communication, and transition the transmitter NFC module from the NFC ENABLED state to the NFC ACTIVE state with the one or more commands, wherein when the NFC controller of the transmitter NFC module is in the NFC ACTIVE state and receives a data send command from the power transmitter system, the NFC controller of the transmitter NFC module is configured to provide data to the power receiver through the NFC driver in response to the data send command and receive response data from the power receiver, wherein the data and the receive response data is related to wireless power transfer between the power transmitter system and the power receiver, the data and the response data including one or more of power transfer power control data, system information data, and authentication data, and wherein the NFC controller of the transmitter NFC module of the wireless power transmitter is configured to detect presence of an NFC card in the absence of the power receiver and to communicate with the power transmitter system through the second interface and first interface to prevent wireless power transfer by the power transmitter system when the NFC card is present.

6. The wireless power system of claim 5, wherein the wireless power transmitter and the wireless power receiver communicate with near-field communications between the transmitter NFC module and the receiver NFC module.

7. The wireless power system of claim 5, wherein the wireless power receiver system is coupled to a graphical user interface (GUI).

8. The wireless power system of claim 7, wherein the GUI communicates data with the power transmitter system.

9. The wireless power system of claim 8, wherein the GUI is configured to provide data and instructions to save, modify, or read data in the power transmitter system.

* * * * *